United States Patent [19]
Koh et al.

[11] Patent Number: 6,002,849
[45] Date of Patent: *Dec. 14, 1999

[54] ORIGINAL READING APPARATUS FOR CONTROLLING ORDER OF PAGES OF ORIGINAL TO BE READ

[75] Inventors: Shokyo Koh, Kawasaki; Akiyoshi Kimura, Kashiwa; Yoshiyuki Suzuki, Yokohama; Tadashi Suzuki, Tokyo; Shinichi Nakamura, Kawasaki; Yoshihiko Suzuki, Toride; Minoru Nada, Kashiwa; Satoru Kutsuwada, Yokohama; Kenji Kobayashi, Tokyo; Satoshi Kaneko, Kawasaki; Norifumi Miyake, Tokyo; Hirohiko Tashiro, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/674,743
[22] Filed: Jul. 2, 1996
[30] Foreign Application Priority Data Jul. 4, 1995 [JP] Japan .................................. 7-189727

[51] Int. Cl.$^6$ ................................ H04N 1/00; H04N 1/40
[52] U.S. Cl. ........................... 395/117; 358/450; 382/284
[58] Field of Search ..................................... 358/444, 443, 358/401, 471, 474, 496, 498, 450; 399/364, 367, 374, 375; 382/284; 395/115–117; H04N 1/00, 1/40

[56] References Cited

U.S. PATENT DOCUMENTS

| | | | |
|---|---|---|---|
| Re. 35,087 | 11/1995 | Uto et al. | 270/50 |
| 4,659,207 | 4/1987 | Maekawa | 355/8 |
| 4,876,609 | 10/1989 | Ogura | 358/443 |
| 4,928,941 | 5/1990 | Uto et al. | 270/53 |
| 5,019,916 | 5/1991 | Ogura | 358/401 |
| 5,105,283 | 4/1992 | Forest et al. | 358/444 |
| 5,124,731 | 6/1992 | Knodt et al. | 346/157 |
| 5,417,417 | 5/1995 | Takehara et al. | 271/296 |
| 5,447,297 | 9/1995 | Murata et al. | 270/50 |
| 5,449,167 | 9/1995 | Takehara et al. | 271/296 |
| 5,488,464 | 1/1996 | Wenthe, Jr. et al. | 355/233 |
| 5,513,017 | 4/1996 | Knodt et al. | 358/471 |
| 5,555,099 | 9/1996 | Telle | 358/401 |
| 5,808,747 | 9/1998 | Telle | 358/444 |

*Primary Examiner*—Kim Yen Vu
*Attorney, Agent, or Firm*—Fitzpatrick, Cella, Harper & Scinto

[57] ABSTRACT

An original reading apparatus includes an original feeding unit for feeding the front and back sides of two-side originals in succession to a reading position, a reader unit for reading the original in the reading position, a memory unit for storing the image data of the original read by the reader unit, a read-out unit adapted to read the image data from the memory unit in the continuous order of pages, in case of reading a bundle of originals wherein the pages are so arranged that a side of the original bears the images of N-th and first pages and the other side of the original bears the images of (N−1)-th and second pages, and an output unit for successively outputting or transmitting the image data read by the read-out unit.

10 Claims, 19 Drawing Sheets

DIRECTION OF ARROW A

S1 (FRONT)

DIRECTION OF ARROW B

S1 (BACK)

ORIGINAL READING APPARATUS FOR CONTROLLING ORDER OF PAGES OF ORIGINAL TO BE READ

BACKGROUND OF THE INVENTION

1. Field of the Invention

The present invention relates to an original reading apparatus capable of controlling the order of pages of images in the originals to be read.

2. Related Background Art

Certain image forming apparatus such as the copying machine are equipped with a discharged sheet processing apparatus, such as sorter, for sorting, aligning and stapling the discharged image forming sheets, and such discharged sheet processing apparatus has a book binding function as one of its functions.

Such book binding function is, as shown in FIG. 18, to form the images of first and last pages on the back side of a recording sheet, to form the image of the second page and the image of the next-to-last page on the front side of the same recording sheet, to also form the images of other pages in a similar manner on both sides of the recording sheets, then, after the discharge of the recording sheets bearing images, to staple the center of the sheets in the superposed state and to fold the sheets in the center to obtain a book.

Also there is conducted page layout control in the image formation, for realizing such book binding function. In such page layout control, each recording sheet and the images formed on both sides thereof are so correlated that the images are positioned on the respectively required pages when the sheets are bound as the book.

Also in case of returning the originals, which are bound as a book with page layout by the above-explained book binding function, into the sheets divided into the original pages, there is employed a method of copying of each page of such bound originals or a method of cutting the bound originals in the center. However the former method is cumbersome and inefficient as the bound originals have to be placed on the original table for the copying of the image of each page. Also in the latter method, as the originals are cut apart, it is difficult to again bind such originals.

Also in case of facsimile transmission of such bound originals, there is employed a method of cutting the bound originals in the center and reading thus cut originals in the order of pages, or a method of copying the respective pages of the bound originals and reading thus copied originals. However, in the former method, it is difficult to bind the cut originals again, and, in the latter method, the copying operation is cumbersome and inefficient, and the copying sheets are wasted.

SUMMARY OF THE INVENTION

An object of the present invention is to provide an original reading apparatus capable of resolving the above-mentioned drawbacks.

Another object of the present invention is to provide an apparatus capable of efficiently returning the original, bound by the book binding function, into sheets divided into the pages or the originals.

Still another object of the present invention is to provide an apparatus capable of easy transmission of the originals, bound by the book binding function, without extra work.

Still other objects of the present invention, and the features thereof, will become fully apparent from the following description which is to be taken in conjunction with the attached drawings.

DESCRIPTION OF THE PREFERRED EMBODIMENTS

The present invention will now be clarified in detail, by preferred embodiments thereof, with reference to the attached drawings.

First Embodiment

Figure 1:
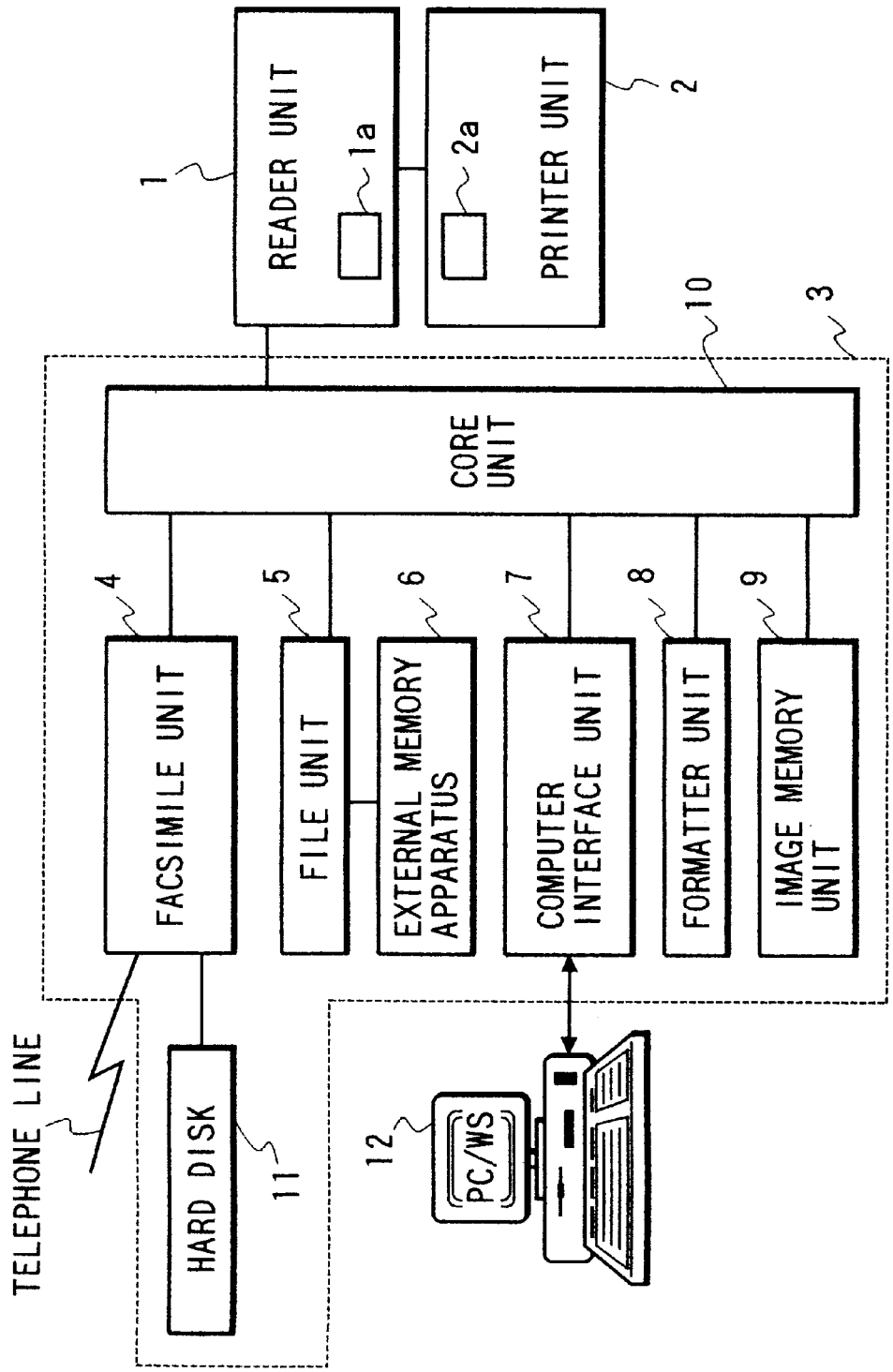
FIG. 1 is a block diagram showing the configuration of a first embodiment of a composite image forming apparatus of the present invention.
Figure 2:
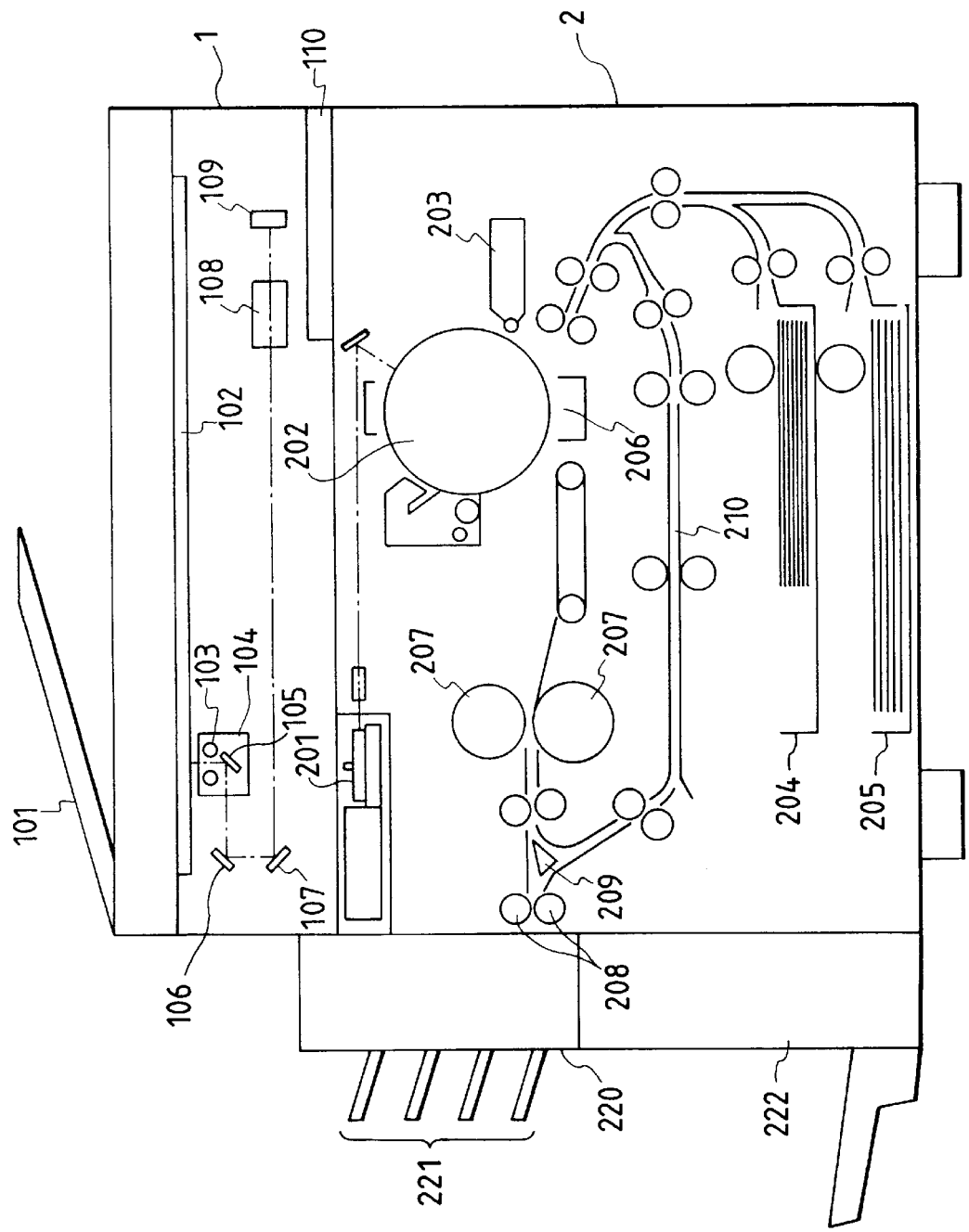
FIG. 2 is a view showing the configuration of an image forming unit composed by a reader unit and a printer unit in the image forming apparatus shown in FIG. 1.
Figure 3:
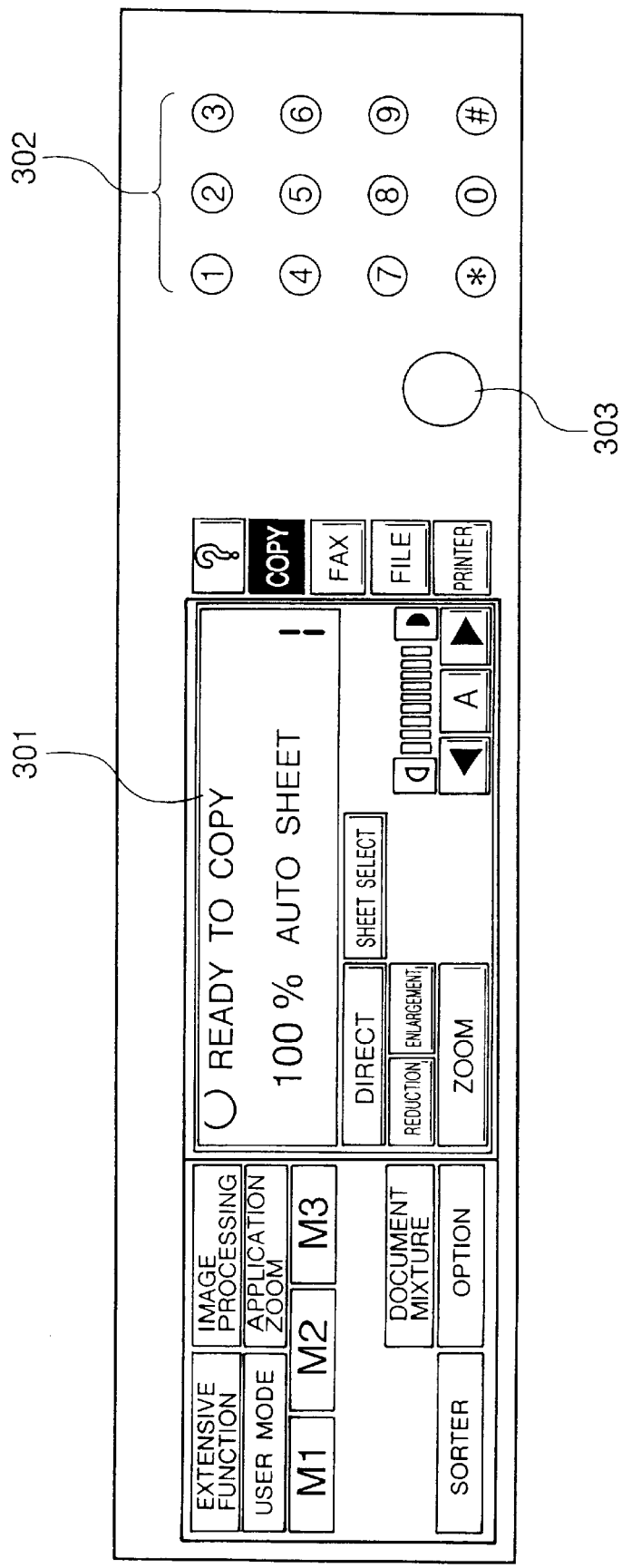
FIG. 3 is a view showing the key arrangement on an operation panel provided in the reader unit of the composite image forming apparatus shown in FIG. 1.

FIG. 1 is a block diagram showing the configuration of a first embodiment of the composite image forming apparatus of the present invention, while FIG. 2 is a view showing the configuration of an image forming unit constructed by mutual combination of a reader unit and printer unit in the composite image forming apparatus shown in FIG. 1, and FIG. 3 is a view showing the key arrangement of an operation panel, provided in the reader unit 1 in the composite image forming apparatus shown in FIG. 1.

The composite image forming apparatus with the facsimile function is provided, as shown in FIG. 1, with a reader unit 1 for reading information of an original and converting such information into image data, and a printer unit 2 including plural recording sheet cassettes (not shown) containing recording sheets of respectively different sizes and adapted to record a visible image, based on the image data, on the recording sheet.

The reader unit 1 is provided with a control unit 1a for the control thereof, and the printer unit 2 is provided with a control unit 2a for the control thereof.

The reader unit 1 is connected to an external apparatus 3, which is provided with a facsimile unit 4, a file unit 5, a computer interface unit 7, a formatter unit 8, an image memory unit 9 and a core unit 10.

The facsimile unit 4 executes facsimile transmission and facsimile reception with another counterpart apparatus through a telephone line. The facsimile unit 4 is connected to a hard disk device 11, which stores communication management information relating to the counterpart apparatus, and image information which has been received and which is to be transmitted.

The file unit 5 causes the external memory device 6 to store image data corresponding to the information of various originals and reads the image data from the external memory device 6.

The computer interface unit 7 effects interfacing with a LAN system and a personal computer 12.

The formatter unit 8 develops the code information, entered from the computer 12, into image information.

The image memory unit 9 stores the image data from the reader unit 1 and also temporarily stores the information from the personal computer 12.

The core unit 10 executes control on state transition by monitoring the operation states of the above-mentioned units, including the reader unit 1 and the printer unit 2, based on detection signals from detection means (not shown), and also executes control on various units.

In the following discussion there will be explained, with reference to FIG. 2, an image forming unit constructed by the combination of the reader unit 1 and the printer unit 2.

The image forming unit, constructed by the combination of the reader 1 and the printer unit 2, is provided, as shown in FIG. 2, with an original feeding device 101 on which the originals to be read are stacked, and is adapted to t ran sport thus stacked originals, one by one, onto an original supporting glass 102.

When an original is transported to a predetermined position on the glass 102, a lamp 103 is turned on and a scanner unit 104 i s set into motion. Thus the surface of the origin al is scanned with the light of the lamp 103, by the movement of the scanner unit 104.

The light reflected from the original is guided, through mirrors 105, 106, 107 and a lens 108, to a CCD image sensor 109.

The CCD 109 effects photoelectric conversion on the light reflected from the original, and the electrical signal obtained by the photoelectric conversion is supplied to an image processing unit 110.

The image processing unit 110 applies various image processing processes to the electrical signal from the CCD 109 to generate an image signal representing the original information. The image signal is stored in an image memory (not shown), having a memory capacity enough for storing the image signal. The image signal may also be stored in a compressed form in the image memory.

The image signal stored in the image memory is supplied to an exposure control unit 201, which converts the image signal into an optical signal by modulation of the image signal.

The optical signal is directed to scan a photosensitive member 202, thereby forming, on the surface thereof, an electrostatic latent image corresponding to the original information. The latent image formed on the photosensitive member 202 is rendered visible as a toner image, by a developing unit 203.

A recording sheet is transported from either of recording sheet cassettes 204, 205 to the gap between a transfer unit 206 and the photosensitive member 202 in synchronization with the front end of the toner image, and the toner image is transferred onto the recording sheet in the transfer unit 206.

The recording sheet bearing the transferred toner image thereon is transported to a fixing unit 207 wherein the toner image is fixed to the recording sheet.

The recording sheet, bearing the fixed toner image, is transported from the fixing unit 207 to a transport path switch member 209, by which the transport direction of the recording sheet is switched either to a discharging direction or to a re-feeding direction.

When the transport direction of the recording sheet is switched by the switch member 210 to the discharge direction, the recording sheet is discharged by discharge rollers 208 to an external discharged sheet processing unit 220. On the other hand, when the transport direction of the recording sheet is directed by the switch member 209 to the re-feeding direction, the recording sheet is once discharged to the discharge rollers 208 and is then transported along a re-feeding transport path 210, whereby the image forming side of the recording sheet is inverted. The recording sheet, of which the image forming side is thus inverted, is again advanced to the gap between the transfer unit 206 and the photosensitive member 202.

The discharged sheet processing unit 220 is provided with plural bins 221 and a book binding unit 222 for effecting a book binding operation.

When a sorting mode is selected, the bins are vertically shifted by a bin shifting motor (not shown) at each discharge of the recording sheet from the discharge rollers 208, whereby the discharged recording sheets are sorted in the bins.

When a stapling mode is selected, in response to a stapling signal from the printer unit 2, the recording sheets in the respective bins are stapled by a stapling unit (not shown) with the movement of the bins by the bin shifting motor, by one bin each time.

The book binding unit 220 binds the discharged recording sheets with staples in the center thereof and folds the thus bound sheets at the center, thereby obtaining a book.

In the following there will be given, with reference to FIGS. 18, 19A and 19B, an explanation on a bundle of recording sheet thus bound as a book.

Figure 18:
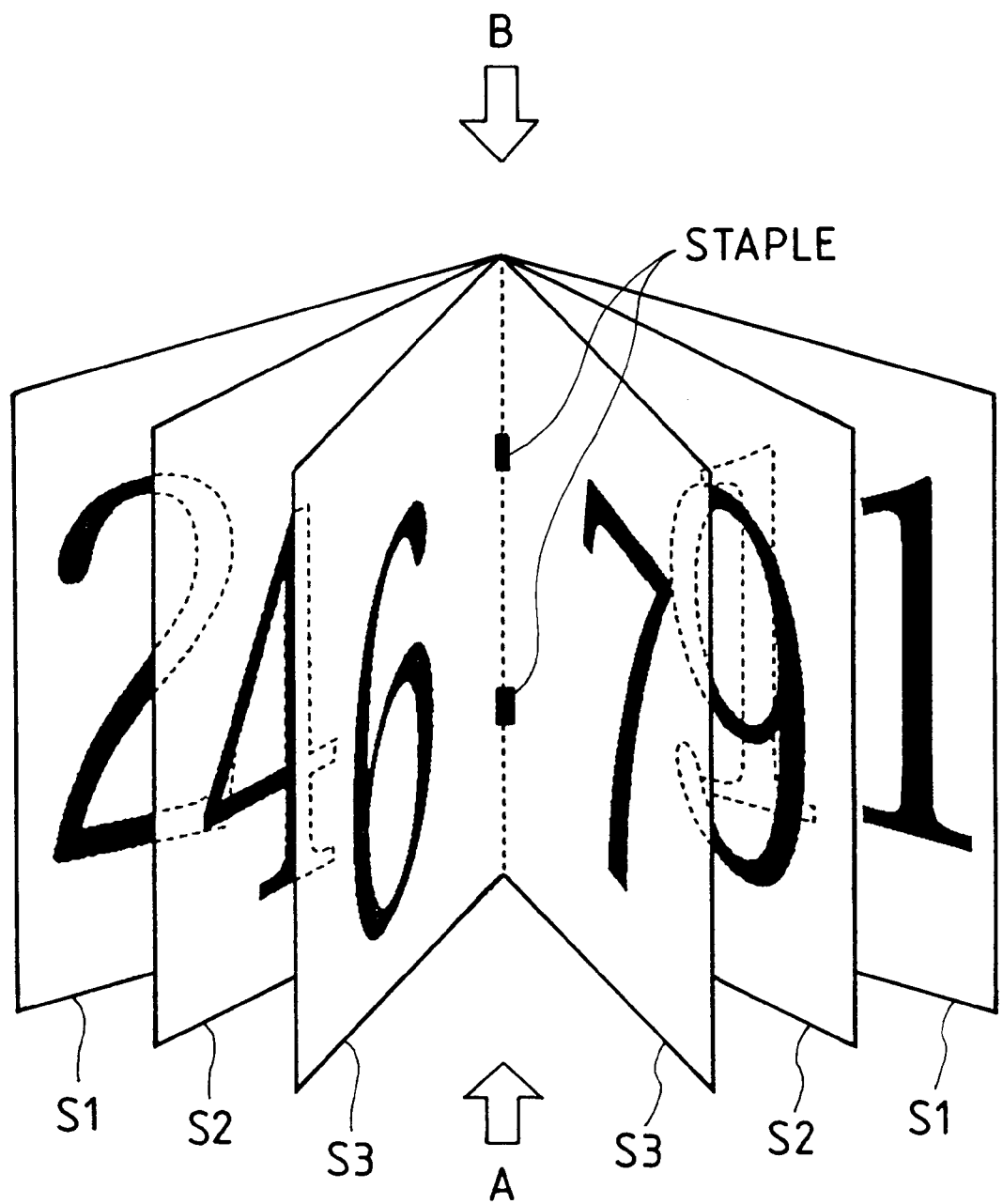
FIG. 18 is an external view showing a bundle of sheets bound by book binding function.

In an example shown in FIG. 18, the bound recording sheets consist of three recording sheets S1, S2, S3 respectively bearing images on both sides. The recording sheets S1, S2, S3 are mutually superposed and stapled and folded in the center. The recording sheets S1, S2, S3 bear images of 4 pages each, or 12 pages in total. More specifically, the recording sheet S1 bears the images of pages 1, 2, 11 and 12, while the recording sheet S2 bears the images of pages 3, 4, 9 and 10, and the recording sheet S3 bears the images of pages 5, 6, 7 and 8.

Figure 19A:
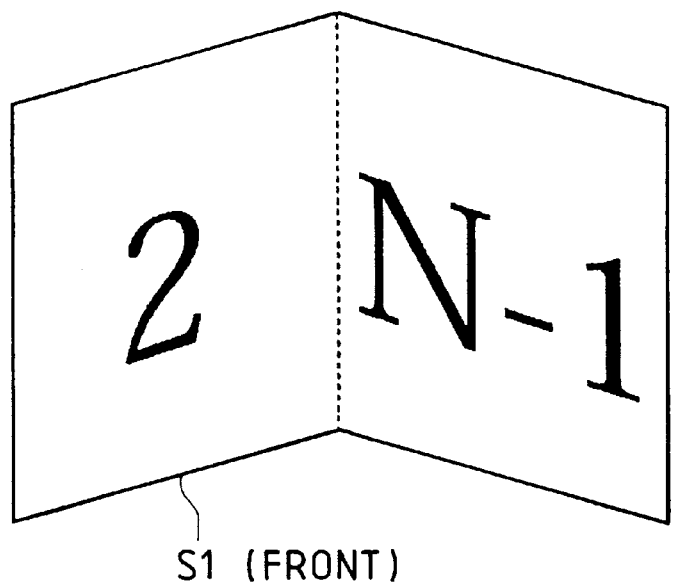
FIGS. 19A and 19B are views showing page layout of the images formed on the sides of a sheet in the bundle shown in FIG. 18.

In general, a side of the recording sheet S1 bears, as shown in FIG. 19A, the image of second page (indicated by "2") and that of an (N–1)-th page. This side of the recording sheet S1, coming to the inside when folded, bears the image of the second page at the left side portion and the image of the (N–1)-th page at the right side portion.

Figure 19B:
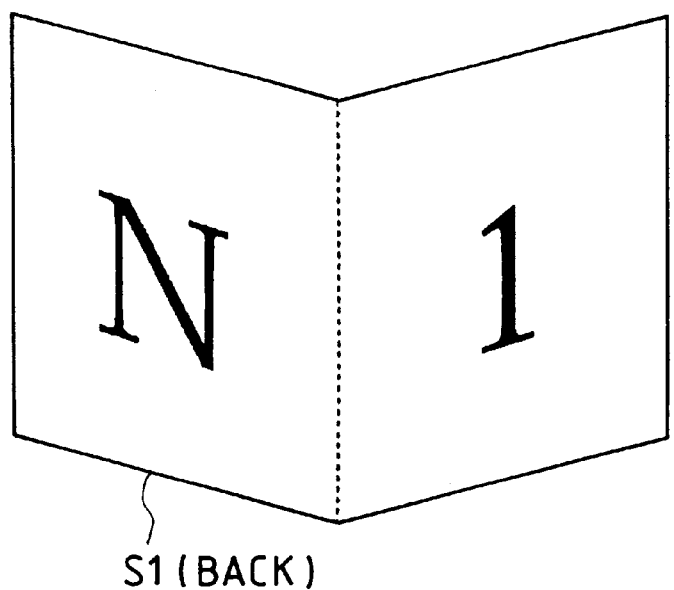

The other side of the recording sheet S1 bears, as shown in FIG. 19B, the images of first page and an N-th page. The other side, coming to the outside when the recording sheet is folded, bears the image of the N-th page at the left side portion and the image of the first page at the right side portion. In this example it is assumed that the original images consist of texts horizontally and that the bound book is to be opened from the left.

Other recording sheets S2, S3 also bear images in a similar manner as in the recording sheet Sl.

In the following there will be explained, with reference to FIG. 3, an operation panel provided on the reader unit 1.

The operation panel on the reader unit 1 is provided, as shown in FIG. 3, with a display unit 301 for displaying the operation status and various messages, numeral keys 302 for entering numerals, and a start key 303 for instructing the start of operation. On the surface of the display unit 301 there is provided a touch panel, forming plural touch keys, including keys for setting the operating conditions such as an operation mode selecting key, an enlargement key and a reduction key.

Now the functions of the composite image forming apparatus of the present embodiment will be explained with reference to the attached drawings.

Figure 4:
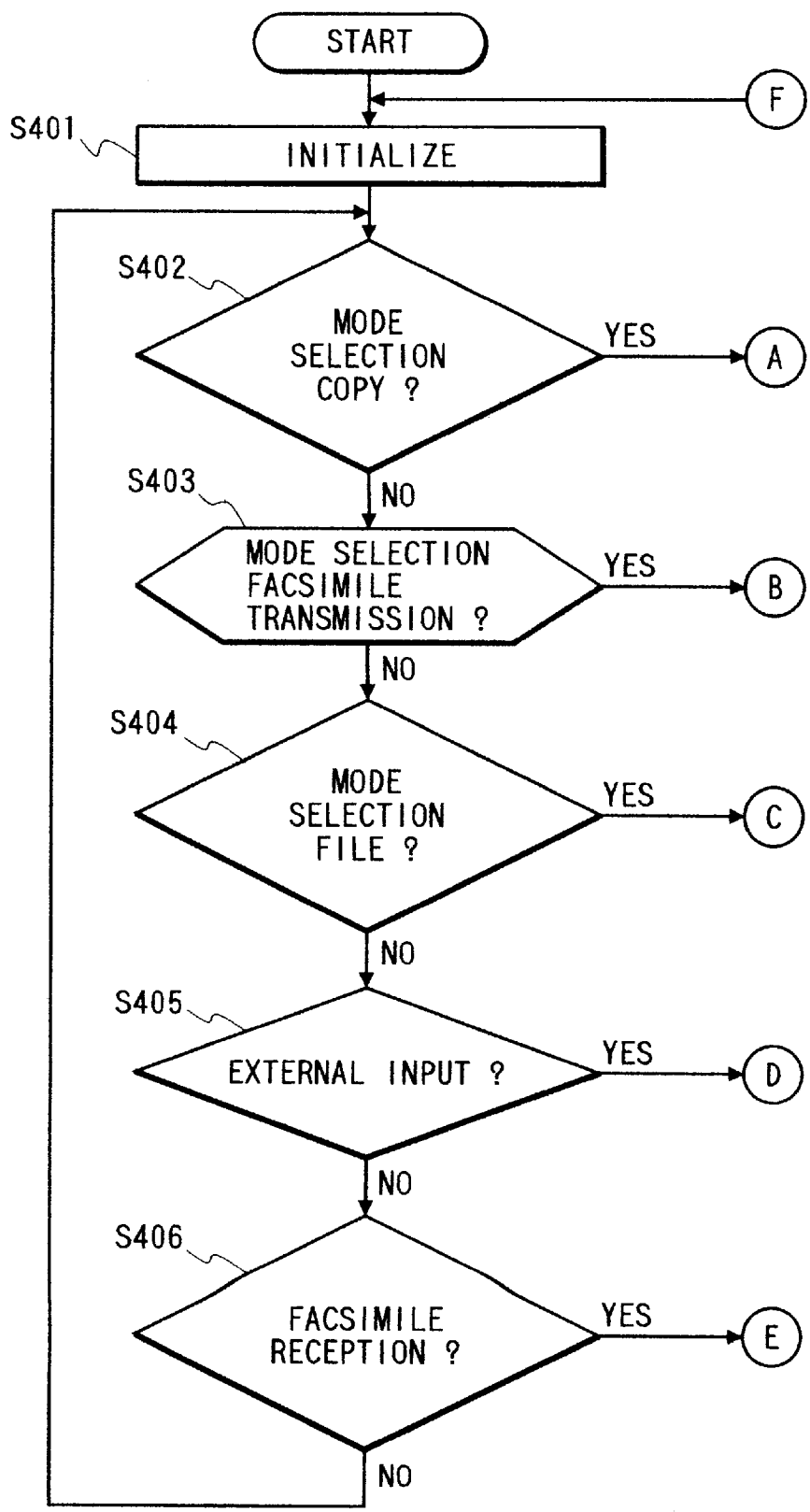
FIG. 4 is a flowchart showing an operation mode selecting operation in the composite image forming apparatus shown in FIG. 1.
Figure 5:
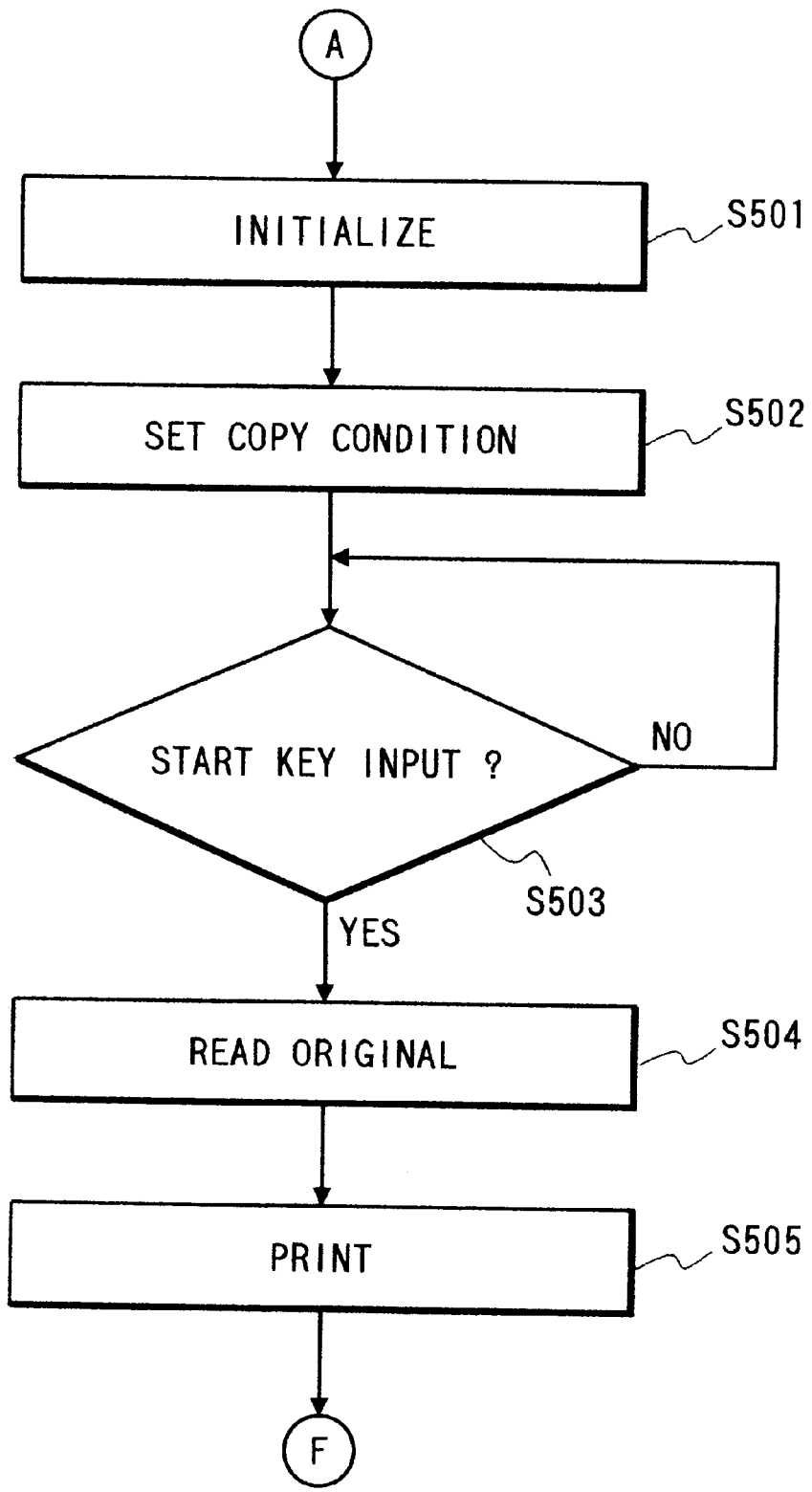
FIG. 5 is a flowchart showing a copy mode in the composite image forming apparatus shown in FIG. 1.
Figure 6:
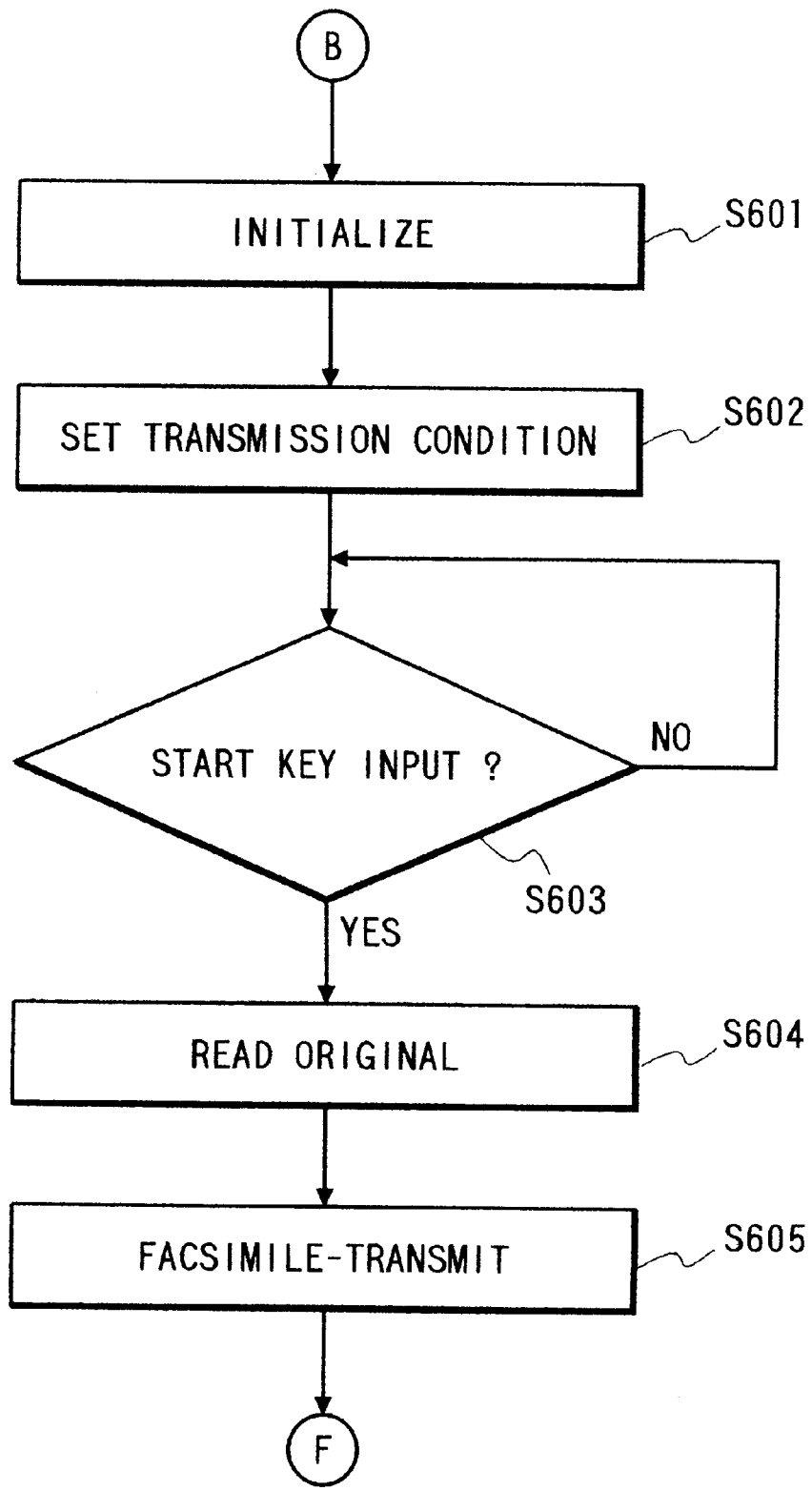
FIG. 6 is a flowchart showing a facsimile transmission mode in the image forming apparatus shown in FIG. 1.
Figure 7:
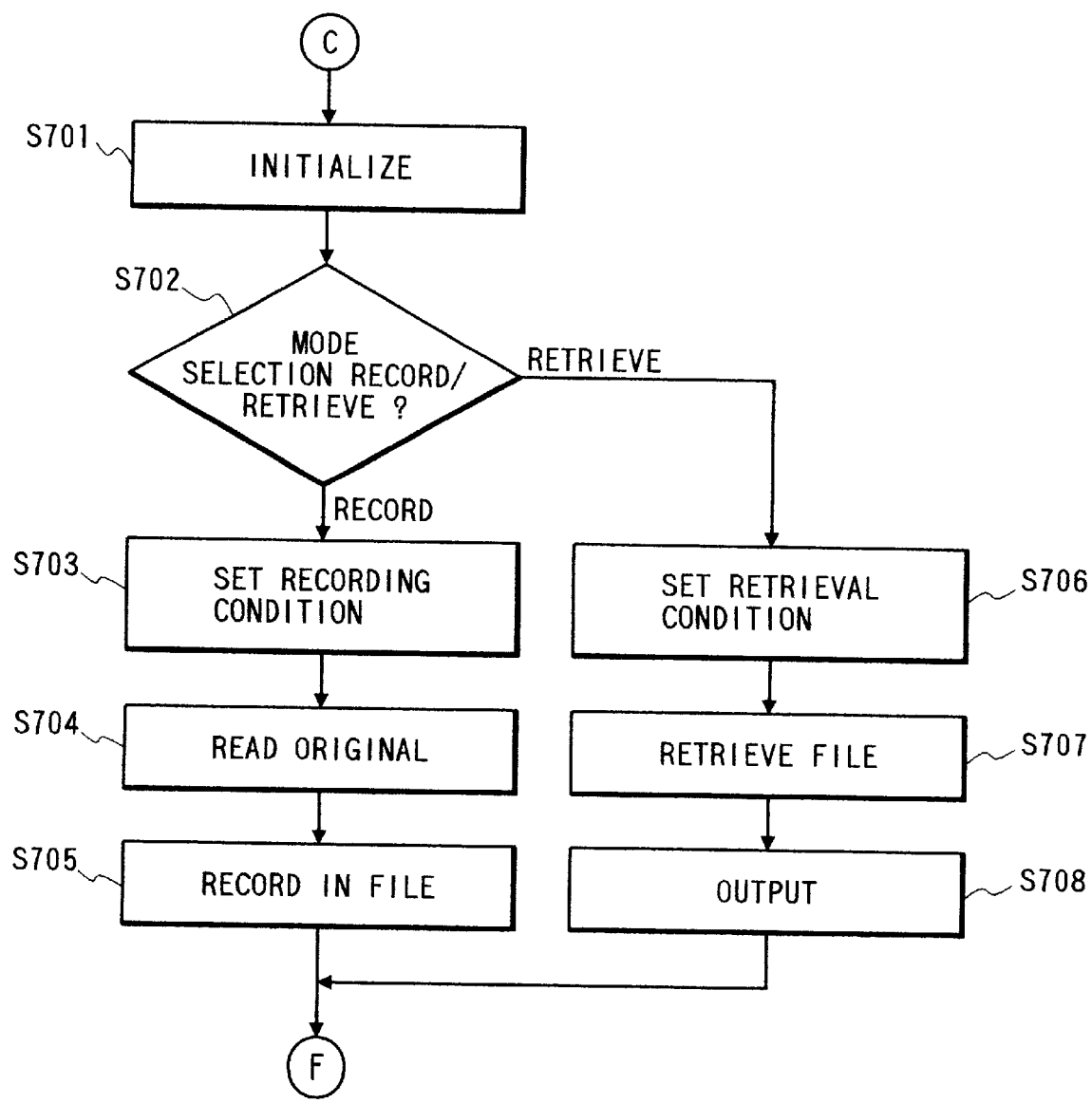
FIG. 7 is a flowchart showing a file mode in the composite image forming apparatus shown in FIG. 1.
Figure 8:
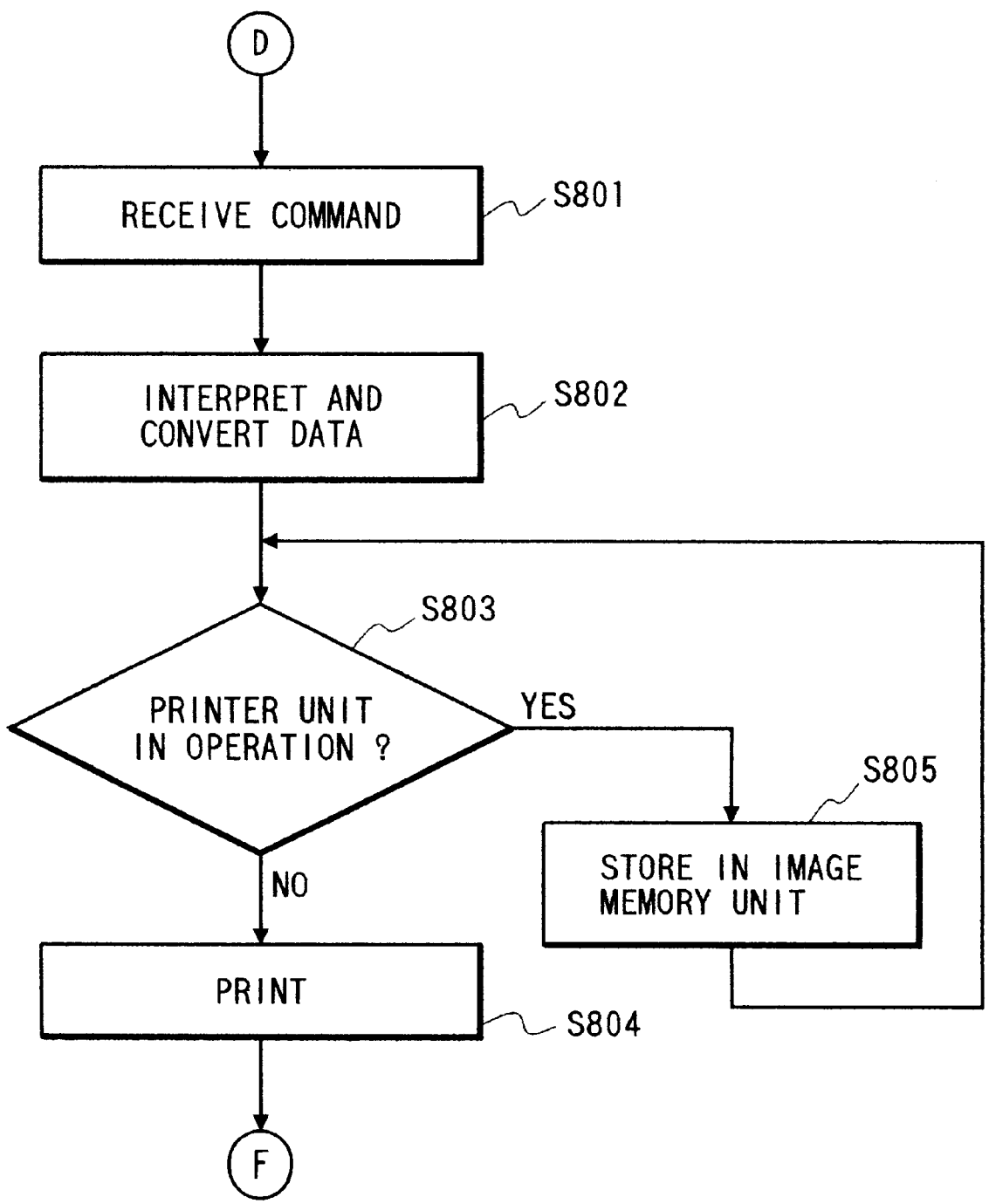
FIG. 8 is a flowchart showing an input mode from a computer interface in the composite image forming apparatus shown in FIG. 1.

FIG. 4 is a flowchart showing an operation mode selecting operation in the composite image forming apparatus shown in FIG. 1; FIG. 5 is a flowchart showing a copy mode therein; FIG. 6 is a flowchart showing a facsimile transmission mode therein; FIG. 7 is a flowchart showing a file mode therein; FIG. 8 is a flowchart showing a computer interface input mode therein; and FIG. 9 is a flowchart showing a facsimile reception mode therein.

At first reference is made to FIG. 4 for explaining the entire operation of the composite image forming apparatus of the present embodiment.

After the power supply is turned on, initialization is executed (step S401). In this initialization, an operation mode selecting key is displayed on the display unit 301 of the operation panel, and a copy mode, a facsimile transmission mode or a file mode is selected by a touch in the display position of such selection key. On the other hand, an input mode from the computer interface or a facsimile reception mode is automatically selected and executed in response to the reception of a corresponding command from the outside.

Figure 9:
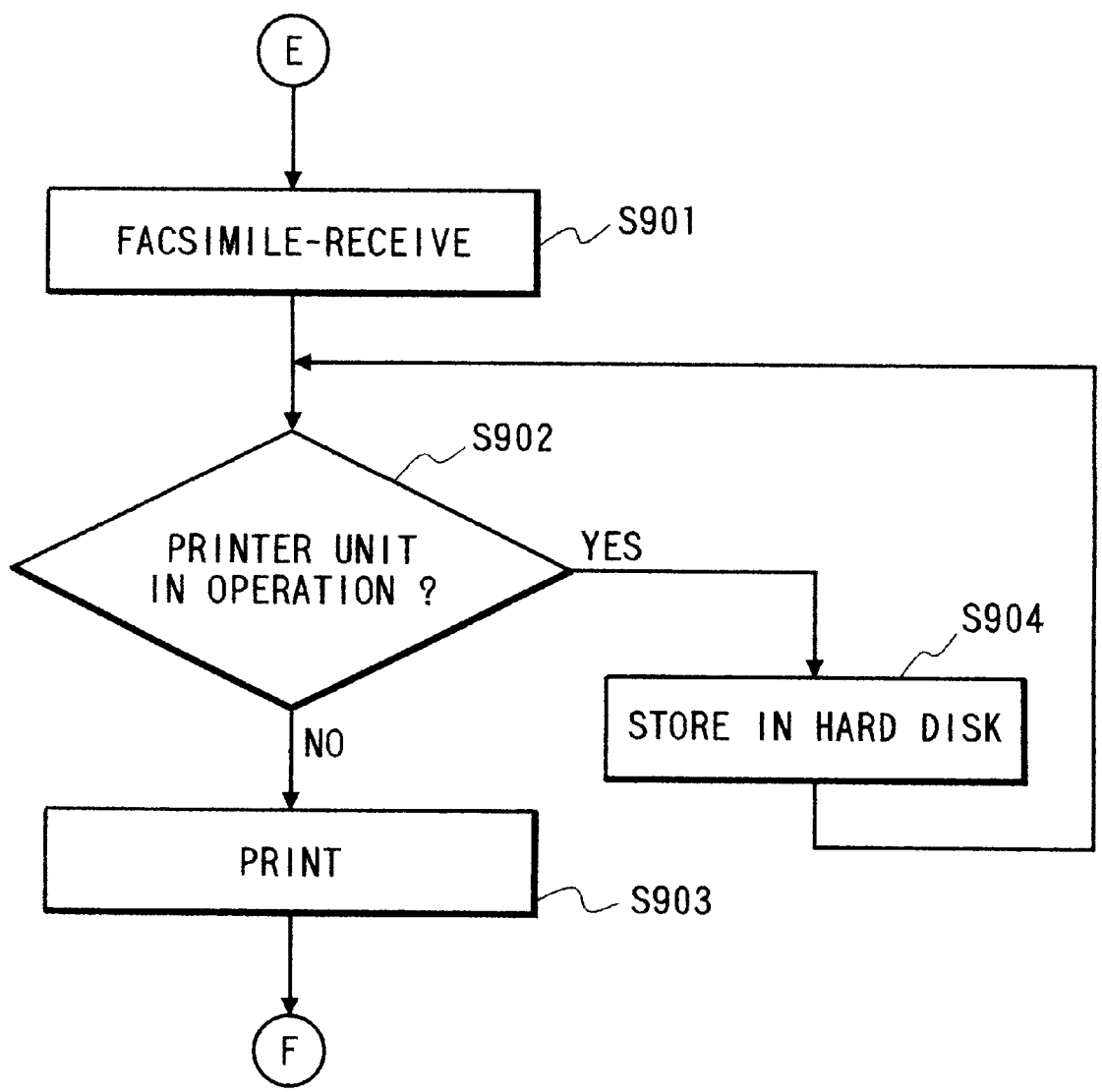
FIG. 9 is a flowchart showing a facsimile reception mode in the composite image forming apparatus shown in FIG. 1.

Then executed are discriminations whether the selected operation mode is the copy mode (step S402), whether it is the facsimile transmission mode (step S403), whether it is the input mode from the computer interface (step S405), and whether it is the facsimile reception mode (step S406), and, according to the results of such discriminations, there is executed the operation of the copy mode (shown in FIG. 5), the facsimile transmission mode (shown in FIG. 6), the file mode (shown in FIG. 7), the input mode from the computer interface (shown in FIG. 8) or the facsimile reception mode (shown in FIG. 9).

In the following the operation of the copy mode will be explained with reference to FIG. 5.

When the copy mode is selected, there is at first executed initialization (step S501) as shown in FIG. 5, and copying conditions are set (step S502) by reading the operated keys, such as the touch keys on the display unit 301 and the numeral keys 302 and setting the corresponding conditions.

After the setting of the copying conditions, there is awaited an input from the start key 303 (step S503). When the start key 303 is depressed, the reader unit 1 reads the original (step S504) and the printer unit forms an image, corresponding to the original information, on a recording sheet (step S505).

After the image formation, the sequence returns to a step S401 in FIG. 4.

In the following the operation in the facsimile transmission mode will be explained with reference to FIG. 6.

When the facsimile transmission mode is selected, there is at first executed initialization (step S601 in FIG. 6), and transmitting conditions are set (step S602), by reading the operated keys such as the touch keys in the display unit 301 or the numeral keys 302 and selecting the corresponding conditions.

After the setting of the transmitting conditions, there is awaited an input from the start key 303 (step S603). When the start key 303 is depressed, the reader 1 reads the original and image data corresponding to the original information are transmitted to the facsimile unit 4 (step S604).

Then the facsimile unit 4 transmits the image data to a partner apparatus, according to the set format and protocol (step S605).

After the transmission, the sequence returns to the step S401 in FIG. 4.

In the following the operation in the file mode will be explained with reference to FIG. 7.

When the file mode is selected, there is at first executed initialization (step S701 in FIG. 7).

After the initialization, the display unit 301 displays selection keys for selecting file recording or file retrieval, and there is awaited an input from a selection key (step S702).

If the file recording is selected, recording conditions are set (step S703) by reading the operated keys such as the touch keys on the display unit 301 and the numeral keys 302 and selecting the corresponding conditions.

After the setting of the recording conditions, image data corresponding to the original information are transmitted to the file unit 5 (step S704).

Then the file unit 5 records the image data in the external recording device 6 (step S705).

After the recording, the sequence returns to the step S401 in FIG. 4.

If the file retrieval is selected (step S702), there are set retrieving conditions (step S706).

Then the files in the external memory device 6 are searched according to the retrieving conditions and the result of search is released (step S707).

After the search, the sequence returns to the step S401 in FIG. 4.

In the following the operation in the input mode from the computer interface will be explained with reference to FIG. 8.

When the input mode from the computer interface is selected, a command from the external personal computer 12 is at first received as shown in FIG. 8 and is transmitted through the core unit 10 to the formatter unit 8 (step S801).

The formatter unit 8 analyzes the command and effects data conversion for example into character information (step S802).

After the data conversion, there is discriminated whether the printer unit 2 is in operation (step S803).

If the printer unit 2 is not in operation, the printer unit 2 is activated to effect data printing according to the command (step S804). After the data printing, the sequence returns to the step S401 in FIG. 4.

If the printer unit 2 is in operation, the data are stored in the image memory unit 9 (step S805). The data stored in the image memory unit 9 are to be printed in the printer unit 2 when it becomes available.

After the data storage in the image memory unit 9, the sequence returns to the step S401 in FIG. 4.

In the following the operation in the facsimile reception mode will be explained with reference to FIG. 9.

When the facsimile reception mode is selected, at first data transmitted from a partner apparatus are received by the facsimile unit 4 (step S901 in FIG. 9).

After the data reception, there is discriminated whether the printer unit 2 is in operation (step S902).

If the printer unit 2 is not in operation, the printer unit 2 is activated to release the recording sheet bearing the received and printed data (step S903). After the release of the recording sheet, the sequence returns to the step S401 in FIG. 4.

If the printer unit 2 is in operation, the received data are stored in the hard disk 11 (step S904). The data stored in the hard disk 11 are to be printed in the printer unit 2 when it becomes available.

After the data storage in the hard disk 11, the sequence returns to the step S401 in FIG. 4.

The above-mentioned operation modes include those which can be executed simultaneously and mutually independently and those which can be executed simultaneously in combination, and the order of priority of such operation modes is determined by the core unit 10.

Figure 10:
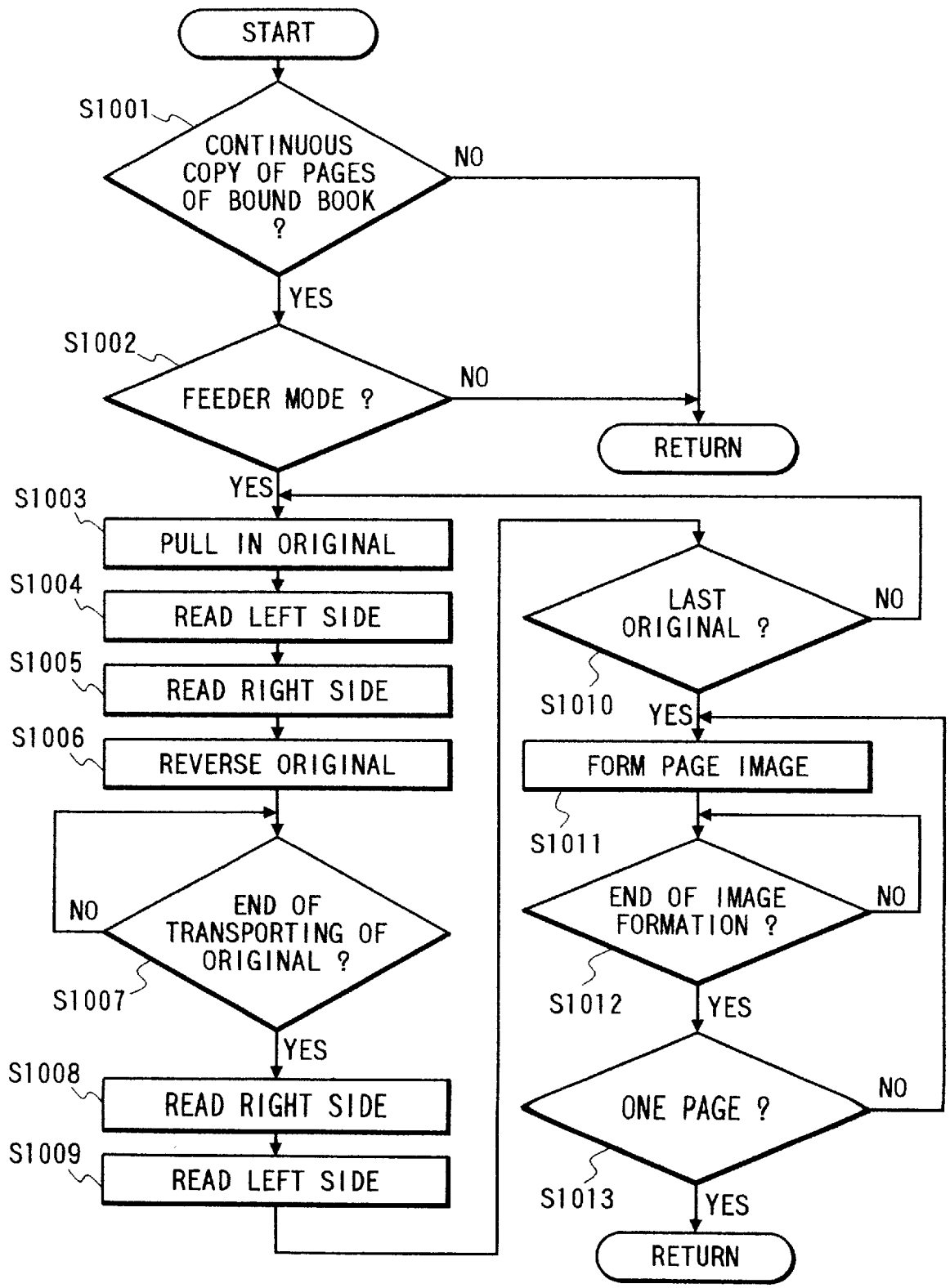
FIG. 10 is a flowchart showing the control sequence for continuous copying for book pages in the composite image forming apparatus shown in FIG. 1.

In the following there will be explained, with reference to FIG. 10, the control sequence for book page continuous copying (consecutively copying the images of pages arranged for book formation). FIG. 10 is a flowchart showing the sequence of book page continuous copying in the composite image forming apparatus shown in FIG. 1. In the present embodiment, the book page continuous copying mode means to remove the staple from a bundle of the recording sheets, bound as shown in FIG. 18 by the book binding process, and to read thus separated sheets, thereby copying the pages on respective recording sheets arranged in the order of pages.

Referring to FIG. 10, there is at first discriminated whether the copy mode is in the book page continuous copying mode (step S1001), and, if not, the sequence proceeds to an ordinary copying operation.

If the copy mode is in the book page continuous copying mode, there is discriminated whether the original feeding is in a feeder mode for automatically feeding the originals with the original feeding device 101 (step S1002). If not, for example if the original feeding is in the manual mode, the sequence shifts to a routine corresponding to such manual mode.

If the original feeding is in the automatic feeding mode with the original feeding device 101, it transports the original onto the original supporting glass 102. The originals are set with the sides A upwards, and are separated in succession from the lowermost one and brought to the original supporting glass 102 through a U-shaped path. The first transported original bears the images of the second and (N−1)-th pages and is so set on the glass 102 that these images face the glass 102 and that the image of the (N−1)-th page (at the right-hand side of the original) is positioned at the reference side for image reading (step S1003).

After positioning of the original on the glass, the image at the left hand side of the original, farther from the reference side for image reading is at first read, and the obtained image data are stored in the image memory, with data compression if necessary (step S1004).

Then the image at the right hand side of the original, closer to the reference side for image reading is read, and the obtained image data are stored in the image memory (step S1005).

After the reading of the images on one side of the original, there is initiated transportation for inverting the original (step S1006). The original is transported along a teardrop-shaped transport path, whereby the opposite side faces the original supporting glass 102. Then there is discriminated whether the original inversion is completed (step S1007). When the inversion is completed, the original is so positioned that a side thereof bearing the images of first and N-th pages face the glass 102 and that the image of the first page (at the right hand side of the original) is positioned at the reference side for image reading.

After the inversion of the original, the image at the right hand side of the original, closer to the reference side, is read and the obtained image data are stored in the image memory (step S1008).

Then the image at the left hand side, farther from the reference side, is read and the obtained image data are stored in the image memory (step S1009).

After such reading of the other side of the original, there is discriminated whether the read original is the last original (S1010), and, if not, the original is discharged from the original supporting glass 102, and there are repeated the pull-in of a next original and the reading of the images on both sides of the next original (steps S1003–S1010).

Such original pull-in and the image reading are conducted to the last original, and, upon completion of the reading of the images on the last original, the image data are read from the image memory and the printer 2 forms an image, corresponding to the image data on the recording sheet (step S1011).

At the start of the image forming operation, the image memory stores the image data in the order of second page, (N−1)-th page, first page, N-th page, fourth page, (N−3)-th page, third page, (N−2)-th page, sixth page, (N−5)-th page, fifth page and (N−4)-th page. The pages of the image data are managed by memorizing the pages of the image data at the storage thereof in the image memory.

When the image forming operation is started, the image data of the N-th page are read at first, with data extension if necessary, and an electrostatic latent image corresponding to such image data is formed on the photosensitive member 202. The image data are read in the decreasing order of pages. The electrostatic latent image is developed into a visible image, which is transferred and fixed onto the recording sheet, whereby the image of the N-th page is formed on the recording sheet. The recording sheet bearing thus formed image is discharged to the outside.

In the course of such image forming process, there is discriminated whether the formation of the electrostatic latent image on the photosensitive member 202 has been completed (step S1012). After the formation of the electrostatic latent image on the photosensitive member 202, there is discriminated whether the image forming operation for the image of the first page has been completed (step S1013), and, if not, there is initiated the image forming operation for the image of the (N–1)-th page. In this manner the image forming operation is conducted in the decreasing order of pages, namely from the last page toward the first page. There is provided a predetermined interval between the end of formation of an electrostatic latent image and the start of formation of a next electrostatic latent image.

In the following there will be explained a routine for the manual mode, which is executed when the original feeding is discriminated as not in the feeder mode for automatically feeding the originals by the original feeding device 101.

In this manual mode routine, the original transportation in the above-explained step S1003 and the original inversion in the step S1006 cannot be conducted automatically, so that the positioning of the original on the original supporting glass and the inversion of the original are executed manually, and the image reading of the original is instructed by the start key 303. Also, when the image forming operation is completed for the images on all the pages, the end of the operation is indicated by a key input by the operator. Other operations are same as in the process explained above.

In this manner an operation of returning the originals, bound by the book binding function, into a bundle of sheets divided into the original pages can be achieved efficiently by the book page continuous copying mode in which the bound sheets respectively bearing the images corresponding to the pages are divided into the unit of each page and such image in each page is copied. In this mode, the recording sheets, bearing the images of respective pages, are outputted in the sequence from the last page, so that the page alignment can be dispensed with.

In the foregoing embodiment there has been explained a composite image forming apparatus provided with the facsimile function and the printer function, but it is also possible to so design an ordinary copying apparatus as to execute the book page continuous copying mode.

Second Embodiment

In the following a second embodiment of the present invention will be explained with reference to FIG. 11, which is a flowchart showing the control sequence of the book page continuous copying in the second embodiment of the composite image forming apparatus of the present invention.

The present embodiment has a configuration same as that of the first embodiment, but divides the image data in the unit of a page after the image data are stored in the image memory.

Figure 11:
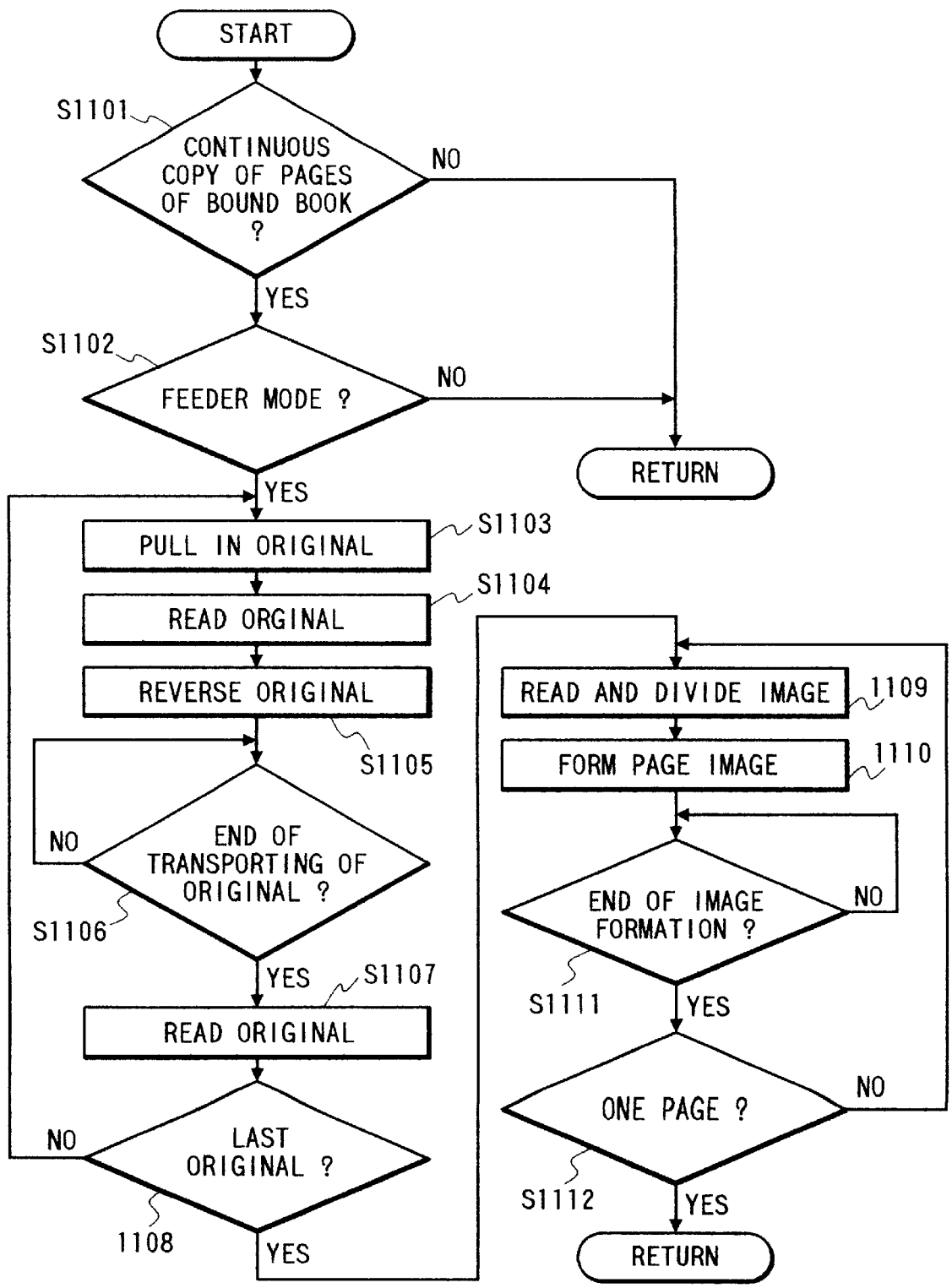
FIG. 11 is a flowchart showing the control sequence for continuous copying for book pages in a second embodiment of the composite image forming apparatus of the present invention.

Referring to FIG. 11, there is at first executed discrimination whether the copy mode is in the book page continuous copying mode (step S1101), and, if not, the sequence shifts to an ordinary copying sequence.

If the copy mode is in the book page continuous copying mode, there is discriminated whether the original feeding is conducted in the feeder mode for automatically feeding the originals by the original feeding device 101 (step S1102). If not, the original feeding mode is identified as the manual mode, and the sequence shifts to a routine corresponding to such manual mode.

If the original feeding mode is identified as the feeder mode, the original feeding device 101 transports the original onto the original supporting glass 102. The first transported original bears the images of the second and (N–1)-th pages and is so set on the glass 102 that these images face the glass 102 and that the image of the (N–1)-th page (at the right-hand side of the original) is positioned at the reference side for image reading (step S1103).

After positioning of the original on the glass, the images on a side of the original are read, and the obtained image data are stored in the image memory, with data compression if necessary (step S1104).

After the reading of the images on one side of the original, there is initiated transportation for inverting the original (S1105). Then there is discriminated whether the original inversion is completed (S1106). When the inversion is completed, the original is so positioned that a side thereof bearing the images of first and N-th pages face the glass 102 and that the image of the first page (at the right-hand side of the original) is positioned at the reference side for image reading.

After the inversion of the original, the images on such the other side of the original are read, and the obtained image data are stored in the image memory (step S1107).

After such reading of the images on the other side of the original, there is discriminated whether the read original is the last original (S1108), and, if not, the original is discharged from the original supporting glass 102, and there are repeated the pull-in of a next original and the reading of the images on both sides of the next original (steps S1103–S1108).

Such original pull-in and the image reading are conducted to the last original, and, upon completion of the reading of the images on the last original, the image data are read from the image memory and divided (step S1109). At this point, the image memory stores the image data in the order of second+(N–1)-th pages, first+N-th pages, fourth+(N–3)-th pages, third+(N–2)-th pages, sixth+(N–5)-th pages, and fifth+(N–4)-th pages.

At the start of image data reading, the image data of the N-th page are read at first, with data extension if necessary, and the image data of a page contained therein (for example, in case of the N-th page, the latter half portion of the read image data) are extracted.

Then the printer unit 2 executes formation of an image corresponding to thus extracted image data of a page (step S1110). In this image formation, an electrostatic latent image, corresponding to the extracted image data of a page, is formed on the photosensitive member 202, and is developed into a visible image, which is transferred and fixed onto the recording sheet, whereby the image of the N-th image is formed thereon. The recording sheet bearing thus formed image is discharged to the outside.

In the course of such image forming process, there is discriminated whether the formation of the electrostatic latent image on the photosensitive member 202 has been completed (step S1111), and, if completed, there is discriminated whether the image formation for the image of the first page has been completed (step S1112).

If not completed, there are executed the reading of the image data including those of the next (N–1)-th page, the division of such image data and the image formation corresponding to the image data of the (N–1)-th page. In this manner there are executed the reading of the image data including those of a page, the division of such image data and the image formation corresponding to thus divided image data in the decreasing order of pages from the last page toward the first page (steps S1109–S1112). There is provided a predetermined interval between the end of formation of an electrostatic latent image and the start of formation of a next electrostatic latent image.

The book page continuous copying mode is terminated when the image formation is completed for the image data of the first page.

In the following there will be explained a routine for the manual mode, which is executed when the original feeding is discriminated as not in the feeder mode for automatically feeding the originals by the original feeding device 101.

In this manual mode routine, the original transportation in the above-explained step S1103 and the original inversion in the step S1105 cannot be conducted automatically, so that the positioning of the original on the original supporting glass and the inversion of the original are executed manually, and the image reading of the original are executed manually, and the image reading of the original is instructed by the start key 303. Also, when the image forming operation is completed for the images on all the pages, the end of the operation is indicated by a key input by the operator. Other operations are same as in the process explained above.

As explained in the foregoing, the present embodiment can reduce the original scanning time in the reader unit 1, in comparison with the foregoing first embodiment, thereby shortening the time required for copying process.

Third Embodiment

In the following discussion, a third embodiment of the present invention will be explained with reference to FIGS. 12 and 13, which are flowcharts showing the control sequence of the book page continuous copying in the third embodiment of the composite image forming apparatus of the present invention.

The present embodiment has a configuration same as that of the first embodiment, but executes the book page continuous copying without relying on the image memory.

Figure 12:
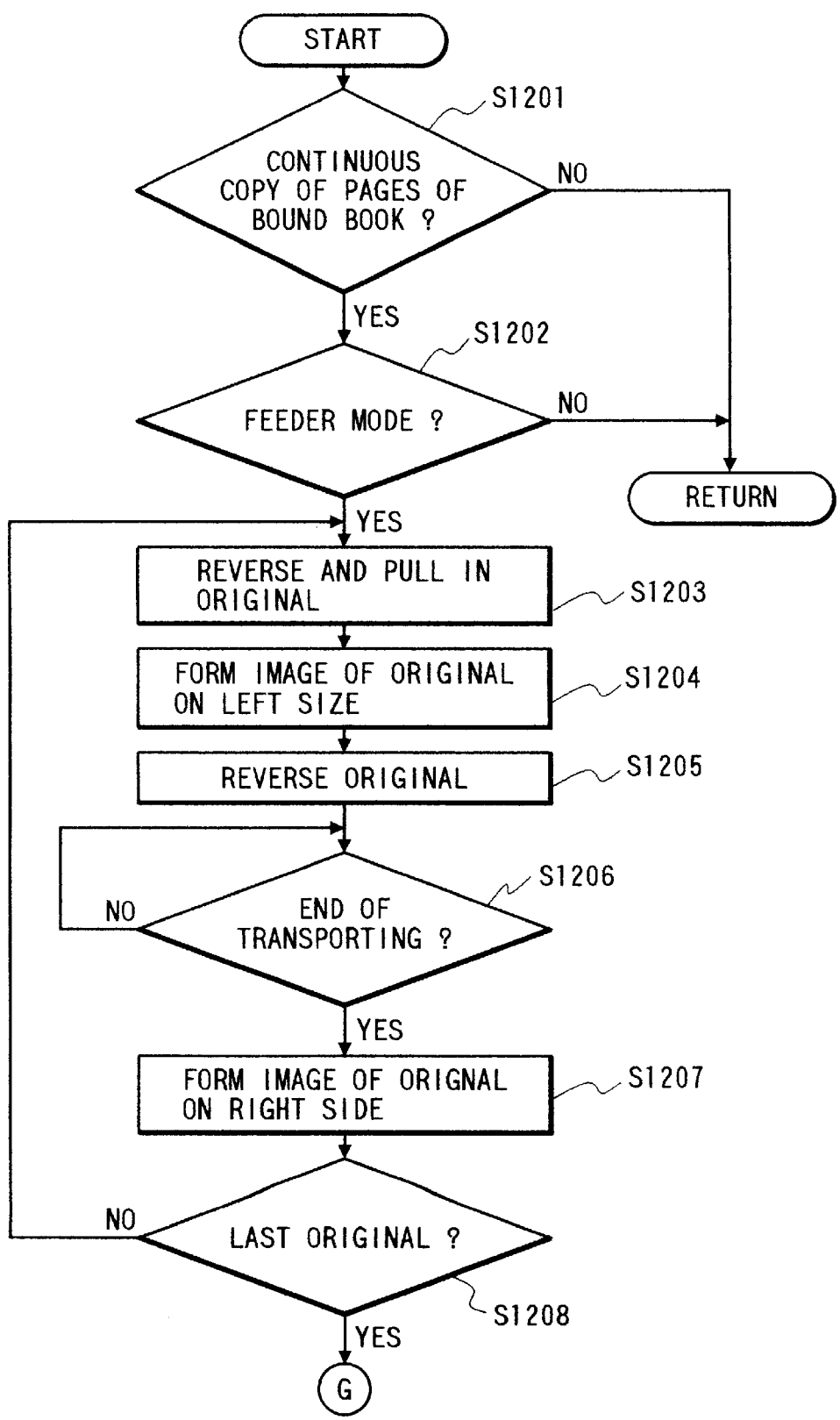
FIGS. 12 and 13 are flowchart showing the control sequence for continuous copying for book pages in a third embodiment of the present invention.
Figure 13:
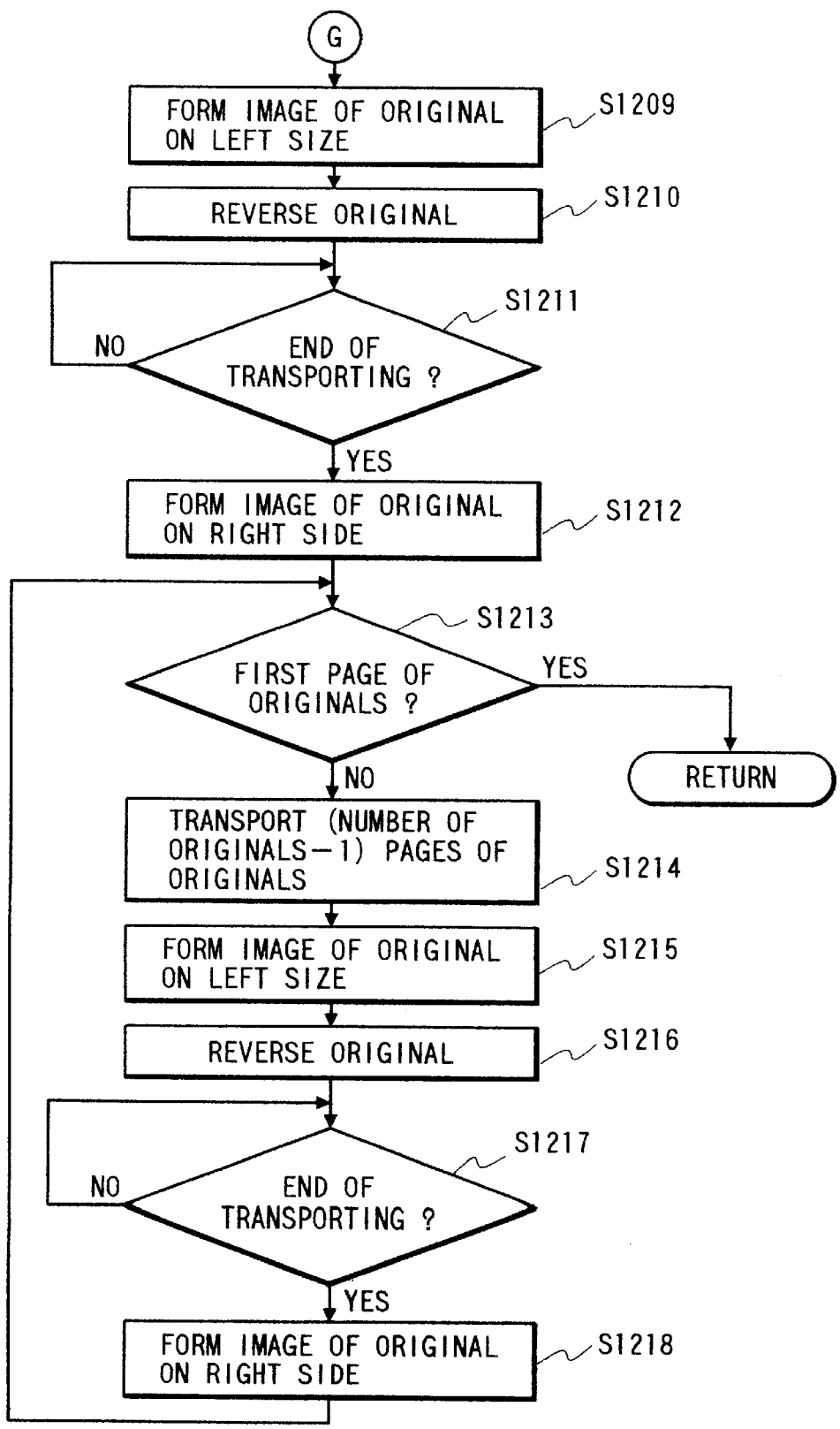

Referring to FIG. 12, there is at first discriminated whether the copying mode is in the book page continuous copying mode (step S1201), and, if not, the sequence shifts to an ordinary copying sequence.

If the copy mode is in the book page continuous copying mode, there is discriminated whether the original feeding is conducted in the feeder mode for automatically and cyclically feeding the originals by the original feeding device 101 (step S1202). If not, there is displayed a message that the book page continuous copying cannot be executed and the sequence is interrupted.

If the original feeding mode is identified as the feeder mode, the original feeding device 101 transports the original, with inversion, onto the original supporting glass 102. The first transported original bears the images of the first and N-th pages and is so set on the glass 102 that these images face the glass 102 and that the image of the first page is positioned at the reference side for image reading (step S1203).

After positioning of the original on the glass, the reader unit 1 reads the image of the first page at the left-hand side of the original, farther from the reference side, and the printer unit 2 forms an image corresponding to the image data (step S1204).

After the image formation, there is initiated transportation for inverting the original (step S1205). Then there is discriminated whether the original inversion is completed (step S1206). When the inversion is completed, the original is so positioned that a side thereof bearing the images of second and (N−1)-th pages faces the glass 102 and that the image of the (N−1)-th page at the right-hand side of the original is positioned at the reference side for image reading.

After the inversion of the original, the image of the (N−1)-th page at the right-hand side of the original, closer to the reference side for image reading, is read and the printer unit 2 forms an image corresponding to the image data (step S1207).

Then there is discriminated whether the read original is the last original (step S1208), and, if not, the original is discharged and the above-explained process starting from the step S1203 is repeated for introducing a next original.

In case the original is discriminated as the last of for example m originals, after the repetition of the steps S1203 to S1207, the original is so positioned on the glass and the images of (2m)-th and (2m+1)-th pages face the glass and that the image of the (2m+1)-th page is positioned at the reference side for image reading, wherein the image formation has been completed to the (2m+1)-th page. More specifically, in case of 3 originals, the seventh page is positioned at the reference side while the sixth page is positioned at the opposite side as shown in FIG. 18, and the image formation is completed to the seventh page.

If the read original is the last original, the image of the (2m)-th page at the left-hand side of the original is read, and image formation is conducted corresponding to the image data (step S1209).

After the image formation, there is initiated transportation for inverting the original (step S1210). Then there is discriminated whether the original inversion is completed (step S1211).

When the inversion is completed, the original is so positioned on the glass 102 that a side of the original bearing the images of (2m+2)-th and (2m−1)-th pages faces the glass 102 and that the image of the (2m−1)-th page at the right-hand side of the original is positioned at the reference side for image reading. As an example, in case of 3 originals, the image of the fifth page is positioned at the reference side for image reading while that of the eighth page is positioned at the opposite side.

After the inversion of the original, the image of the (2m−1)-th page at the right-hand side of the original, closer to the reference side for image reading, is read, and the printer unit 2 forms an image corresponding to the image data (step S1212).

Then there is discriminated whether the read original is the first original (step S1213). If not, the original is discharged and the originals are then transported by a number corresponding to the total number of the originals minus one, thereby placing an original on the glass 102 (step S1214). As an example, in case of 3 originals, after the discharge of the original present on the glass, the next original is transported and immediately discharged and the second next original is placed on the original supporting glass 102.

Then the image at the left-hand side of the original, farther from the reference side, is read and the printer unit 2 forms an image corresponding to the image data (step S1215).

After the image formation, there is initiated transportation for inverting the original (step S1216). Then there is discriminated whether the original inversion is completed (step S1217).

After the original inversion, the image at the right-hand side of the original, closer to the reference side, is read and the printer unit 2 forms an image corresponding to the image data (step.S1218).

After the image formation, the sequence returns to the step S1213 and there is discriminated whether the read original is the first original. If so, the read original is discharged and the sequence is terminated.

As explained in the foregoing, the present embodiment enables the book page continuous copying without relying on the costly image memory and can therefore reduce the cost in comparison with the foregoing first and second embodiments requiring the image memory.

Fourth Embodiment

In the following a fourth embodiment of the present invention will be explained with reference to FIG. 14, which is a flowchart showing the control sequence of the book page continuous copying in the fourth embodiment of the composite image forming apparatus of the present invention.

The present embodiment is same, in configuration as the first embodiment, but is adapted to effect a mode of dividing sheets, bearing the images of respective pages on both sides and bound by the book binding process, into the unit of each page and to effect facsimile transmission of the image of each page. In this embodiment, the book page continuous copying mode means to divide the sheets, bearing the images of respective pages on both sides and bound by the book binding process, into the unit of each page and to effect facsimile transmission of the image of each page.

Figure 14:
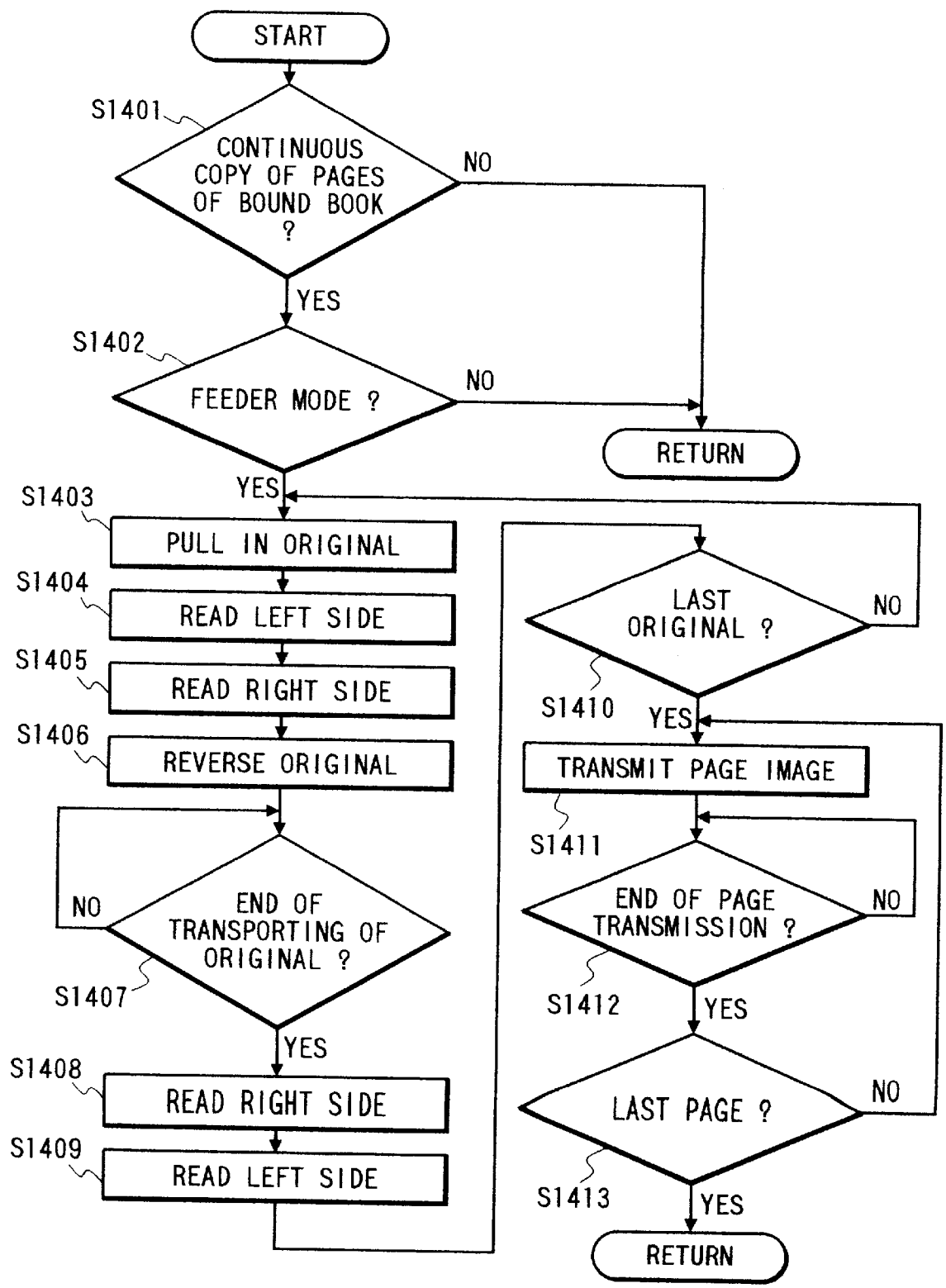
FIG. 14 is a flowchart showing the control sequence for continuous copying for book pages in a fourth embodiment of the composite image forming apparatus of the present invention.

Referring to FIG. 14, there is at first discriminated whether the facsimile transmission mode is in the book page continuous copying mode (step S1401), and, if not, the sequence shifts to an ordinary facsimile transmission sequence.

If the facsimile transmission mode is in the book page continuous copying mode, there is discriminated whether the feeding of the originals to be transmitted is in the feeder mode for automatically feeding the originals by the original feeding device 101 (step S1402). If not, the original feeding is discriminated as in the manual mode and the sequence shifts to a routine corresponding to such manual mode.

If the original feeding mode is identified as the feeder mode for automatically feeding the originals by the original feeding device 101, the original feeding device 101 transports the original onto the original supporting glass 102. The first transported original bears the images of second and (N−1)-th pages and is so set on the glass 102 that these images face the glass 102 and that the image of the (N−1)-th page at the right-hand side of the original is positioned at the reference for image reading (step S1403).

After such positioning of the original on the glass, the image at the left-hand side of the original, farther from the reference side, is read and the obtained image data are stored in the image memory, with compression if necessary (step S1404).

Then the image at the right-hand side of the original is read, and the obtained image data are stored in the image memory (step S1405).

After the reading of a side of the original, there is initiated transportation for inverting the original (step S1406). Then there is discriminated whether the original inversion is completed (step S1407). When the inversion is completed, the original is so positioned that a side thereof bearing the images of first and N-th pages faces the glass 102 and that the image of the first page, at the right-hand side of the original, is positioned at the reference side for image reading.

After the inversion of the original, the image at the right-hand side of the original, closer to the reference side, is read and the obtained image data are stored in the image memory (step S1408).

Then the image at the left-hand side of the original, farther from the reference side, is read and the obtained image data are stored in the image memory (step S1409).

After the reading of the other side of the original, there is discriminated whether the read original is the last original (step S1410), and, if not, the read original is discharged from the original supporting glass 102 and the process for pull-in of a next original and image reading thereon is repeated (steps S1403–S1410).

The original pull-in and the image reading are repeated to the last original, and, after the image reading on the last original, the facsimile unit 4 effects an operation of reading the image data from the image memory and transmitting the image data to a partner apparatus through a telephone line (step S1411).

At the start of such facsimile transmission, the image memory stores the image in the order of second page, (N−1)-th page, first page, N-th page, fourth page, (N−3)-th page, third page, (N−2)-th page, sixth page, (N−5)-th page, fifth page and (N−4)-th page.

In the transmitting operation, the image data of the first page are at first read, with extension if necessary, and are transmitted. In this manner the transmission of the image data is executed in the order from the first page to the last page.

In the course of such transmission, there is monitored whether the transmission has been completed for the image data of a page (step S1412), and, upon completion of the transmission of the image data of a page, there is discriminated whether the transmitted image data are those of the last page (step S1413).

The sequence is terminated when the transmission of the image data of the last page is completed.

In the following there will be explained a routine for the manual mode, which is executed when the original feeding is discriminated as not in the feeder mode for automatically feeding the originals by the original feeding device 101.

In this manual mode routine, the original transportation in the above-explained step S1403 and the original inversion in the step S1406 cannot be conducted automatically, so that the positioning of the original on the original supporting glass or the original image reading is instructed by the start key 303. Other operations are same as in the process explained above.

As explained in the foregoing, the present embodiment enables easily facsimile transmission of the originals bound by the book binding function, by the book page continuous copying mode in which the sheets, bearing the images corresponding to the respective pages by the book binding function, are divided in the unit of each page and the image of each page is facsimile transmitted, instead of adopting a method of cutting the bound originals in the center thereby dividing the originals into the unit of each page, or a method of copying of each page of the bound originals and transmitting thus copied originals.

The present embodiment employs, for the purpose of storing the read image data, the image memory for transferring the image data from the reader unit 1 to the printer unit 2, but it is also possible to instead use the hard disk 11 or a memory in the external apparatus 3. Since the image memory for transferring the image data from the reader unit 1 to the printer unit 2 is so designed as to store multi-value data and is therefore expensive, the use of the hard disk 11 or the memory in the external apparatus 3 allows to avoid the increase in the image memory capacity and to avoid the increase in the cost resulting from such increase in the memory capacity.

Fifth Embodiment

In the following a fifth embodiment of the present invention will be explained with reference to FIG. 15, which is a flowchart showing the control sequence of the book page continuous copying in the fifth embodiment of the composite image forming apparatus of the present invention.

The present embodiment is same, in configuration, as the first embodiment but is adapted, in contrast to the fourth embodiment, to effect the book page continuous copying by dividing the image data into the unit of a page after the image data are stored in the image memory.

Figure 15:
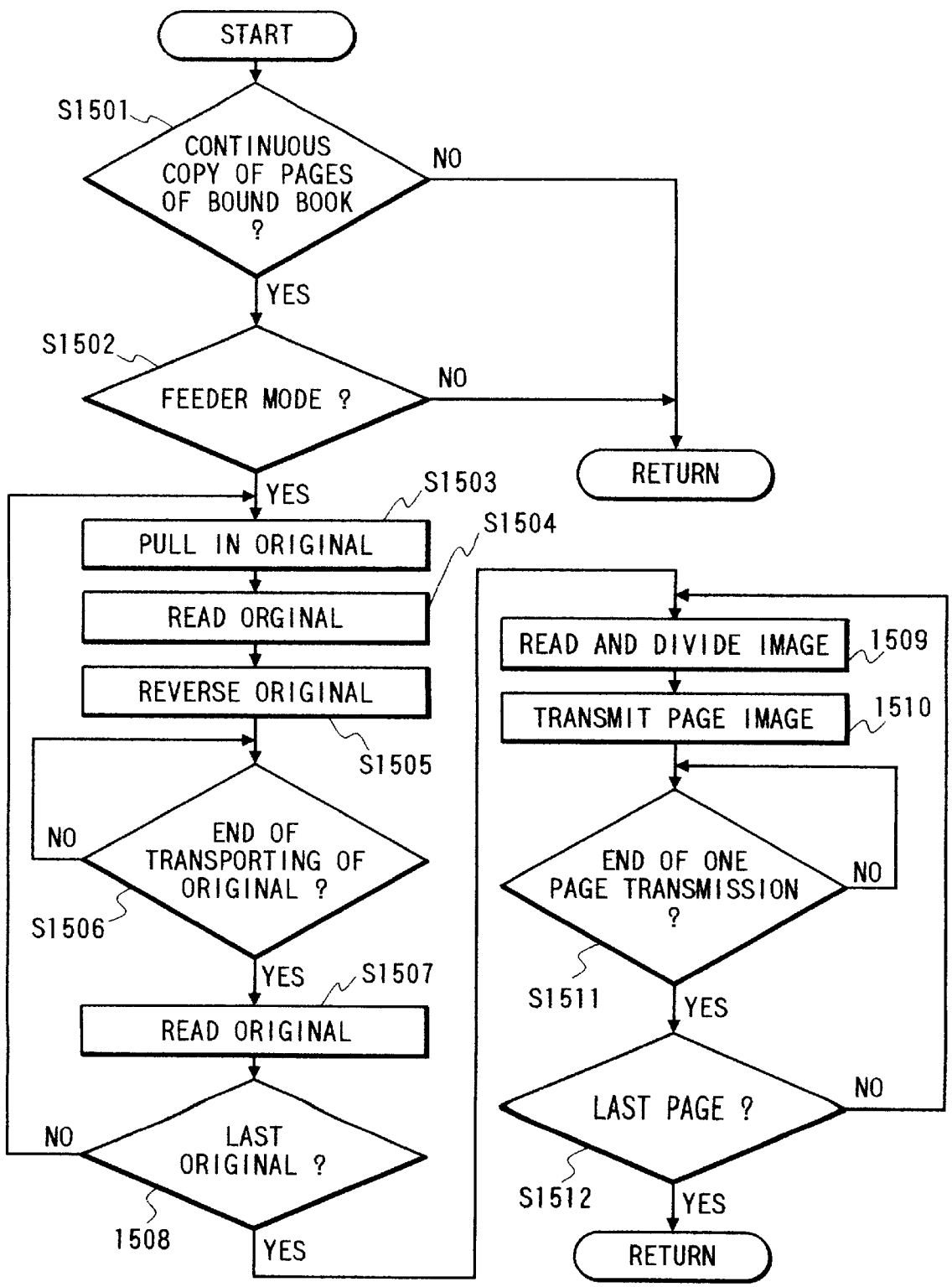
FIG. 15 is a flowchart showing the control sequence for continuous copying for book pages in a fifth embodiment of the composite image forming apparatus of the present invention.

Referring to FIG. 15, there is at first executed discrimination whether the facsimile transmission mode is in the book page continuous copying mode (step S1501), and, if not, the sequence shifts to an ordinary facsimile transmitting operation.

If the facsimile transmission mode is in the book page continuous copying mode, there is discriminated whether the original feeding is conducted in the feeder mode for automatically feeding the originals by the original feeding device 101 (step S1502). If not, the original feeding mode is identified as the manual mode, and the sequence shifts to a routine corresponding to such manual mode.

If the original feeding mode is identified as the feeder mode, the original feeding device 101 transports the original onto the original supporting glass 102. The first transported original bears the images of second and (N−1)-th pages and is so set on the glass 102 that these images face the glass 102 and the image of the (N−1)-th page at the right-hand side of the original is positioned at the reference side for image reading (step S1503).

After positioning of the original on the glass, the images on a side of the original are read, and the obtained image data are stored in the image memory (step S1504). These image data are then transferred to the facsimile unit 4 and stored in the hard disk 11, with compression if necessary.

After the reading of the images on one side of the original, there is initiated transportation for inverting the original (step S1505). Then there is discriminated whether the original inversion is completed (step S1506). When the inversion is completed, the original is so positioned that a side thereof bearing the images of first and N-th pages faces the glass 102 and that the image of the first page at the right-hand side of the originals is positioned at the reference side for image reading.

After the inversion of the original, the images on such the other side of the original are read, and the obtained image data are stored in the hard disk 11 (step S1507).

After the reading of the images on the other side of the original, there is discriminated whether the read original is the last original (step S1508), and, if not, the original is discharged from the original supporting glass 102, and there are repeated the pull-in of a next original and reading of the images on both sides of the next original (steps S1503–S1508).

Such original pull-in and the image reading are conducted to the last original, and, upon completion of the reading of the images on the last original, the image data are read from the hard disk 11 and divided (step S1509). At this point, the disk stores the image data in the order of second+(N−1)-th pages, first+N-th pages, fourth+(N−3)-th pages, third+(N−2)-th pages, sixth+(N−5)-th pages, and fifth+(N−4)-th pages.

At the start of image data reading, the image data including the image of the first page are read at first, when data extension if necessary, and the data of a page contained therein (for example, in case of the first page, the former half portion of the read image data) are extracted.

Then the facsimile unit 4 transmits the extracted image data of a page to the partner apparatus through the telephone line (step S1510).

Then there is discriminated whether the transmission of the image of the first page has been completed (step S1511).

Upon completion of the transmission of the image of the first page, there is discriminated whether the transmission has been completed for the image of the last page (step S1512). If not, the sequence of the steps S1509–S1512 is repeated to transmit the images to the last page.

The facsimile transmission in the book page continuous copying mode is terminated at the end of the image data transmission of the last page.

In the following discussion there will be explained a routine for the manual mode, which is executed when the original feeding is discriminated as not in the feeder mode for automatically feeding the originals by the original feeding device 101.

In this manual mode routine, the original transportation in the above-explained step S1503 and the original inversion in the step S1505 cannot be conducted automatically, so that the original image reading is instructed by the start key 303. Other operations are same as in the process explained above.

As explained in the foregoing discussion, the present embodiment allows a reduction in the original scanning time in the reader unit 1 in comparison with the first embodiment, and does not hinder other functions such as the copying function.

In the foregoing there has been explained a composite image forming apparatus provided with the facsimile function, but it is also possible to design a facsimile apparatus as to execute the book page continuous copying mode.

Sixth Embodiment

In the following discussion a sixth embodiment of the present invention will be explained with reference to FIGS. 16 and 17, which are flowcharts showing the control sequence of the book page continuous copying in the sixth embodiment of the composite image forming apparatus of the present invention.

The present embodiment is the same, in configuration, as the first embodiment, but is capable, in contrast to the fourth embodiment, of executing the book page continuous copying without relying on the image memory for storing the read image data.

Figure 16:
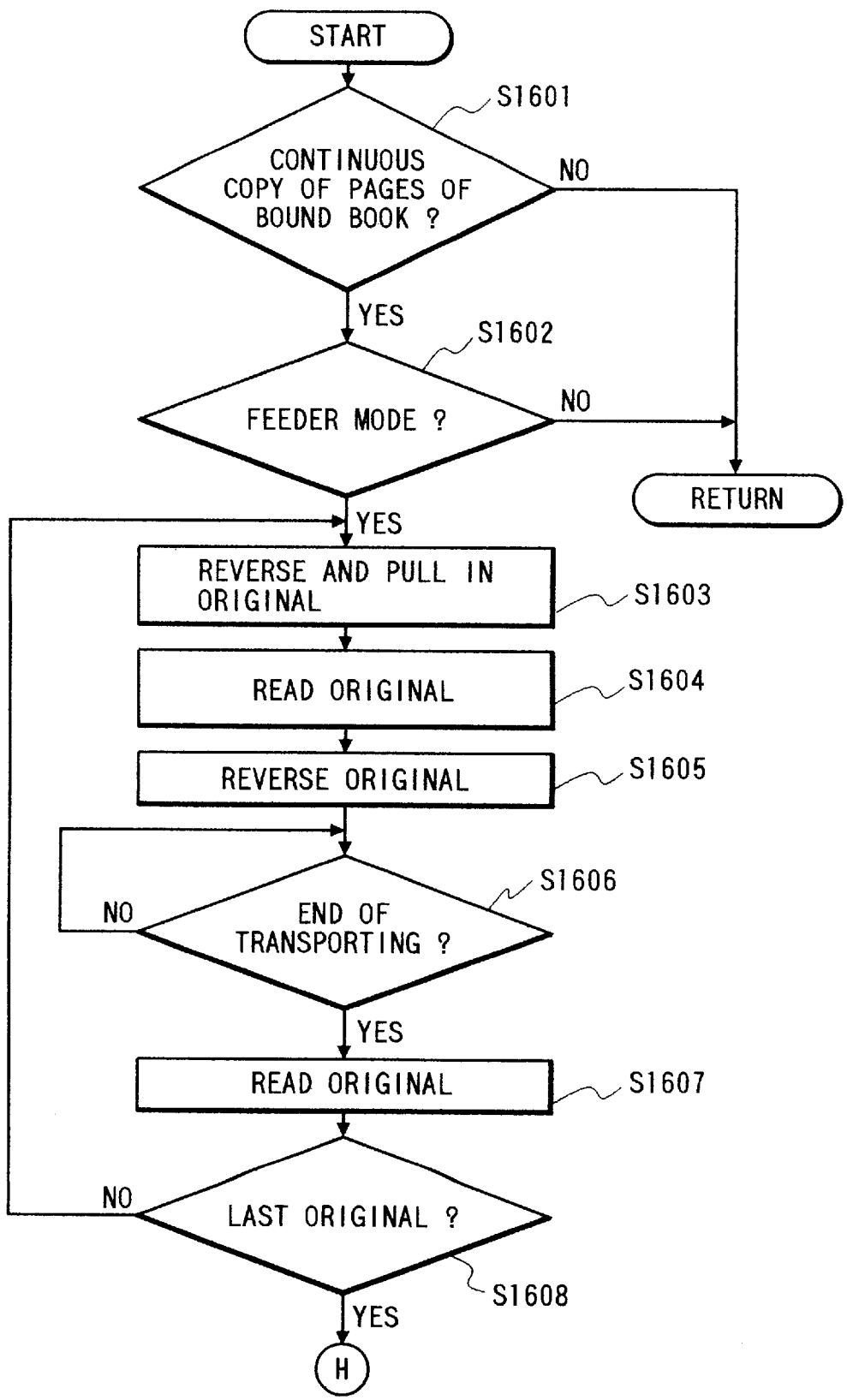
FIGS. 16 and 17 are flowchart showing the control sequence for continuous copying for book pages in a sixth embodiment of the composite image forming apparatus of the present invention.

Referring to FIG. 16, there is at first discriminated whether the facsimile transmission mode is in the book page continuous copying mode (step S1601), and, if not, the sequence shifts to an ordinary facsimile transmission sequence.

If the facsimile transmission is in the book page continuous copying mode, there is discriminated whether the original feeding is conducted in the feeder mode for automatically and cyclically feeding the originals by the original feeding device 101 (step S1602). If not, there is displayed a message that the book page continuous copying cannot be executed and the sequence is interrupted.

If the original feeding mode is identified as the feeder mode, the original feeding device 101 transports the original, with inversion, onto the original supporting glass 102. The first transported original bears the images of the first and N-th pages and is so set on the glass 102 that these images face the glass 102 and that the image of the first page is positioned at the reference side for image reading (step S1603).

After positioning of the original on the glass, the reader unit 1 reads the image of the first page at the right-hand side of the original, closer to the reference side, and the obtained image data are transmitted to the facsimile unit 4, which stores the image data with compression in the hard disk 11 and effects transmission to the partner apparatus (step S1604).

After the image transmission, there is initiated transportation for inverting the original (step S1605). Then there is discriminated whether the original inversion is completed (step S1606). When the inversion is completed, the original is so positioned that a side thereof bearing the images of second and (N−1)-th pages faces the glass 102 and that the image of the (N−1)-th page at the right-hand side of the original is positioned at the reference side for image reading.

After the inversion of the original, the image of the second page at the left-hand side of the original is read, and the facsimile unit 4 transmits the obtained image data (step S1607).

Then there is discriminated whether the read original is the last original (step S1608), and, if not, the original is discharged and the above-explained process starting from the step S1603 is repeated for introducing a next original.

In case the original is discriminated as the last of for example m originals, after the repetition of the steps S1603 to S1607, the original is so positioned on the glass that the images of (2m)-th and (2m+1)-th pages face the glass and that the image of the (2m+1)-th page is positioned at the reference side for image reading, wherein the transmission has been completed to the (2m)-th page. More specifically, in case of 3 originals, the seventh page is positioned at the reference side while the sixth page is positioned at the opposite side as shown in FIG. 18 and the transmission has been completed to the sixth page.

Figure 17:
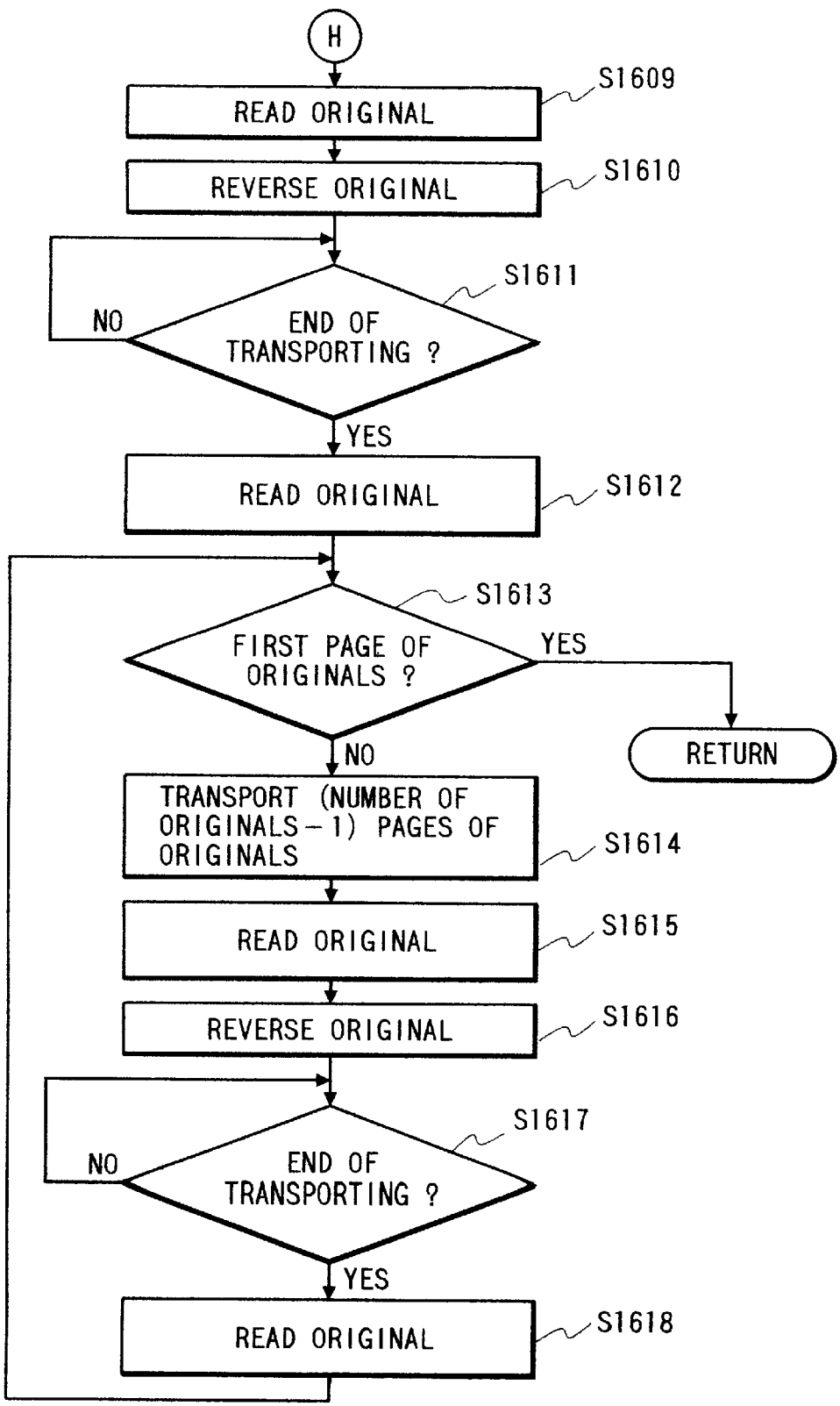

If the read original is the last original, the image of the (2m+1)-th page at the left-hand side of the original, as shown in FIG. 17, is read and the obtained image data are transmitted (step S1609).

After the image transmission, there is initiated transportation for inverting the original (step S1610). Then there is discriminated whether the original inversion is completed (step S1611). When the inversion is completed, the original is so positioned on the glass 102 that a side thereof bearing the images of (2m+2)-th and (2m−1)-th pages faces the glass 102 and that the image of the (2m−1)-th page at the right-hand side of the original is positioned at the reference side for image reading. As an example, in case of 3 originals, the image of the fifth page is positioned at the reference side while that of the eighth page is positioned at the opposite side.

After the inversion of the original, the image of the (2m+2)-th page at the right-hand side of the original, farther from the reference side for image reading, is read, and the facsimile unit 4 transmits the obtained image data (step S1612).

Then there is discriminated whether the read original is the first original (step S1613). If not, the original is discharged with inversion, and the originals are then transported by a number corresponding to the total number of the originals minus one, thereby placing an original on the glass 102 (step S1614). As an example, in case of 3 originals, after the inverted discharge of the original present on the glass, the next original is transported and immediately discharged and the second next original is placed on the original supporting glass 102.

Then the image at the right-hand side of the original, closer to the reference side, is read and the facsimile unit 4 transmits the obtained image data (step S1615).

After the image transmission, there is initiated transportation for inverting the original (step S1616). Then there is discriminated whether the original inversion is completed (step S1617).

After the original inversion, the image at the left-hand side of the original, farther from the reference side, is read and the facsimile unit 4 transmits the obtained image data (step S1618).

After the image transmission, the sequence returns to the step S1613 and there is discriminated whether the read original is the first original. If so, the read original is discharged and the sequence is terminated.

As explained in the foregoing discussion, the present embodiment enables the book page continuous copying without relying on the costly image memory and can therefore reduce the cost in comparison with the foregoing fourth embodiment requiring image memory.

What is claimed is:

1. An original reading apparatus comprising:

original feeding means for feeding front and back sides of originals in succession to a reading position;

reading means for reading the original in said reading position;

memory means for storing image data of the original read by said reading means;

read out means for reading the image data from said memory means in a continuous order of N pages when a stack of originals are fed by said original feeding means one-by-one wherein each side of each original bears images for two pages, one side of the first original bearing the images on a first page and an N-th page, an other side of the first original bearing the images on a second page and an (N−1)th page, one side of the second original facing the other side of the first original bearing the images on a third page and an (N−2)th page and an other side of the second original bearing the images on a fourth page and an (N−3)th page, and subsequent ones of the originals bearing images on pages in the same relationship as the first and second originals; and output means for successively outputting the image data read by said read-out means, wherein the images of the originals which were read in the order of the second and (N−1)th pages of the first original; the first and N-th pages of the first original; the fourth and (N−3)th pages of the second original; the third and the (N−2)th pages of the second original and the images of the pages of the subsequent ones of the originals which were read in the same relationship as the first and second originals are output in one of a decreasing order of the N-th page to the first page and an increasing order of the first page to the Nth page.

2. An original reading apparatus according to claim 1, wherein said read-out means starts the read-out of the image data, after said reading means completes the reading of all the pages of the stack of the originals.

3. An original reading apparatus according to claim 1, wherein said read-out means effects the read-out in the decreasing order of pages, starting from the N-th page, and said output means prints an image corresponding to the image data of each page on a sheet.

4. An original reading apparatus according to claim 1, wherein said read-out means effects the read-out in the increasing order of pages, starting from the first page, and said output means effects facsimile transmission of the image data.

5. An original reading method comprising the steps of:

feeding front and back sides of two-side originals in succession to a reading position;

reading the original in said reading position;

storing image data of the original read in said reading step in memory means;

reading out the image data from the memory means in the continuous order of pages; when a stack of originals are fed in said feeding step one-by-one wherein each side of each original bears images for two pages, one side of the first original bearing the images on a first page and an Nth page, another side of the first original bearing the images on a second page and an (N−1)th page, one side of the second original facing the other side of the first original bearing the images on a third page and an (N−2)th page and an other side of the second original bearing the images on a fourth page and an (N−3)th page, and subsequent ones of the originals bearing images on pages in the same relationship as the first and second originals; and successively outputting the read image data, wherein the images of the originals which were read in the order of the second and (N−1)th pages of the first original; the first and Nth pages of the first original; the fourth and (N−3)th pages of the second original; the third and the (N−2)th pages of the second original and the images of the pages of the subsequent ones of the originals which were read in the same relationship as the first and second originals are output in one of a decreasing order of the Nth page to the first page and an increasing order of the first page to the Nth page.

6. An original reading method according to claim 5, wherein said reading out step starts the read-out of the image data, after the reading of all the pages of the stack of the originals is completed.

7. An original reading method according to claim 5, wherein said reading out step effects the read-out in a decreasing order of pages, starting from the N-th page, and said output step prints an image corresponding to the image data of each page on a sheet.

8. An original reading method according to claim 5, wherein said reading out step is adapted to effect the read-out in an increasing order of pages, starting from the first page, and said output step effects facsimile transmission of the image data.

9. An original reading apparatus comprising:

original feeding means for feeding front and back sides of originals in succession to a reading position;

reading means for reading the original in said reading position;

memory means for storing image data of the original read by said reading means;

read out means for reading the image data from said memory means in a continuous order of N pages when a stack of originals are fed by said original feeding means one-by-one wherein each side of each original bears images for two pages, one side of the first original bearing the images on a first page and an Nth page, an other side of the first original bearing the images on a second page and an (N−1)th page, one side of the second original facing the other side of the first original bearing the images on a third page and an (N−2)th page and an other side of the second original bearing the images on a fourth page and an (N−3)th page, and subsequent ones of the originals bearing images on pages in the same relationship as the first and second originals; and output means for successively outputting the image data read by said read-out means, wherein the images read in the fed order are output in one of a decreasing order of the Nth page to the first page and an increasing order of the first page to the Nth page.

10. An original reading method comprising the steps of:

feeding front and back sides of two-side originals in succession to a reading position;

reading the original in said reading position;

storing image data of the original read in said reading step in memory means;

reading out the image data from the memory means in the continuous order of pages; when a stack of originals are fed in said feeding step one-by-one wherein each side of each original bears images for two pages, one side of the first original bearing the images on a first page and an Nth page, another side of the first original bearing the images on a second page and an (N−1)th page, one side of the second original facing the other side of the first original bearing the images on a third page and an (N−2)th page and an other side of the second original bearing the images on a fourth page and an (N−3)th page, and subsequent ones of the originals bearing images on pages in the same relationship as the first and second originals; and successively outputting the read image data, wherein the images read in the fed order are output in one of a decreasing order of the Nth page to the first page and an increasing order of the first page to the Nth page.

* * * * *

UNITED STATES PATENT AND TRADEMARK OFFICE
CERTIFICATE OF CORRECTION

PATENT NO. : 6,002,849
DATED : December 14, 1999
INVENTOR(S) : Shokyo Koh, et al.

It is certified that error appears in the above-identified patent and that said Letters Patent is hereby corrected as shown below:

COLUMN 3
Line 53, "t ran sport" should read -- transport --; and
Line 57, "i s" should read -- is -- and "origin al" should read -- original --.

COLUMN 9
Line 50, "same" should read -- the same --.

COLUMN 11
Line 35, "same" should read -- the same --.

COLUMN 12
Line 13, "of" should read -- of, --;
Line 14, "example" should read -- example, --; and
Line 67, "(step.S1218)." should read -- (step S1218). --.

COLUMN 13
Line 17, "same," should read -- the same --.

COLUMN 15
Line 12, "same, in configuration," should read -- the same in configuration --.

COLUMN 18
Line 46, "an other" should read -- another --.

UNITED STATES PATENT AND TRADEMARK OFFICE
CERTIFICATE OF CORRECTION

PATENT NO. : 6,002,849
DATED : December 14, 1999
INVENTOR(S) : Shokyo Koh, et al.

It is certified that error appears in the above-identified patent and that said Letters Patent is hereby corrected as shown below:

COLUMN 19
Line 27, "an other" should read -- another --.

COLUMN 20
Lines 19 & 46 "an other" should read --another --.

Signed and Sealed this

Thirty-first Day of July, 2001

*Attest:*

*Attesting Officer*

NICHOLAS P. GODICI
*Acting Director of the United States Patent and Trademark Office*